US012681187B2

(12) United States Patent
Gassend et al.

(10) Patent No.: US 12,681,187 B2
(45) Date of Patent: Jul. 14, 2026

(54) METHODS AND SYSTEMS TO DETERMINE A STRATEGY FOR A DROP PROCESS ASSOCIATED WITH A LIGHT DETECTION AND RANGING (LIDAR) DEVICE

(71) Applicant: Waymo LLC, Mountain View, CA (US)

(72) Inventors: Blaise Gassend, East Palo Alto, CA (US); Scott McCloskey, Mountain View, CA (US); Stephen Osborn, Redwood City, CA (US); Nicholas Armstrong-Crews, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/750,514

(22) Filed: Jun. 21, 2024

(65) Prior Publication Data

US 2024/0345254 A1     Oct. 17, 2024

Related U.S. Application Data

(63) Continuation of application No. 18/166,550, filed on Feb. 9, 2023, now Pat. No. 12,044,781, which is a (Continued)

(51) Int. Cl.
*G01S 17/931* (2020.01)
*G01S 7/4861* (2020.01)
(Continued)

(52) U.S. Cl.
CPC .......... *G01S 17/931* (2020.01); *G01S 7/4861* (2013.01); *G01S 17/10* (2013.01); *G01S 17/89* (2013.01); *G05D 1/0088* (2013.01); *G05D 1/81* (2024.01)

(58) Field of Classification Search
CPC ...... G01S 17/931; G01S 7/4861; G01S 17/10; G01S 17/89; G01S 7/4814; G01S 13/86; (Continued)

(56) References Cited

U.S. PATENT DOCUMENTS

| 7,590,070 B1 | 9/2009 | Asawa et al. |
| 8,525,835 B1 | 9/2013 | Wu et al. |
| | (Continued) | |

FOREIGN PATENT DOCUMENTS

| CN | 105184854 A | 12/2015 |
| CN | 106885574 A | 6/2017 |
| | (Continued) | |

OTHER PUBLICATIONS

R. Heinzler et al., "CNN-Based Lidar Point Cloud De-Noising in Adverse Weather", in IEEE Robotics and Automation Letters, vol. 5, No. 2, pp. 2514-2521, Apr. 2020, doi: 10.1109/LRA.2020. 2972865. (Year: 2020).

(Continued)

*Primary Examiner* — Ellis B. Ramirez
(74) *Attorney, Agent, or Firm* — McDonnell Boehnen Hulbert & Berghoff LLP

(57) ABSTRACT

Example implementations may relate to determining a strategy for a drop process associated with a light detection and ranging (LIDAR) device. In particular, the LIDAR device could emit light pulses and detect return light pulses, and could generate a set of data points representative of the detected return light pulses. The drop process could involve a computing system discarding data point(s) of the set and/or preventing emission of light pulse(s) by the LIDAR device. Accordingly, the computing system could detect a trigger to engage in the drop process, and may responsively (i) use information associated with the environment around the vehicle, operation of the vehicle, and/or operation of the (Continued)

700 —

OPERATE, BY A COMPUTING SYSTEM, A LIGHT DETECTION AND RANGING (LIDAR) DEVICE TO SCAN AN ENVIRONMENT AROUND A VEHICLE, WHERE THE OPERATING COMPRISES CAUSING THE LIDAR DEVICE TO EMIT LIGHT PULSES AND TO DETECT RETURN LIGHT PULSES, WHERE THE LIDAR DEVICE IS CONFIGURED TO GENERATE A SET OF DATA POINTS REPRESENTATIVE OF THE DETECTED RETURN LIGHT PULSES, WHERE THE COMPUTING SYSTEM IS CONFIGURED TO ENGAGE IN A DROP PROCESS THAT INCLUDES ONE OR MORE OF (I) DISCARDING ONE OR MORE DATA POINTS OF THE SET OR (II) PREVENTING EMISSION OF ONE OR MORE LIGHT PULSES BY THE LIDAR DEVICE, AND WHERE THE COMPUTING SYSTEM IS FURTHER CONFIGURED TO TRANSMIT, TO A COMPUTING DEVICE VIA A COMMUNICATION CHANNEL, REMAINING DATA POINTS OF THE SET OTHER THAN THE ONE OR MORE DATA POINTS THAT ARE DISCARDED — 702

DETERMINE, BY THE COMPUTING SYSTEM, INFORMATION ASSOCIATED WITH ONE OR MORE OF THE ENVIRONMENT AROUND THE VEHICLE, OPERATION OF THE VEHICLE, OR OPERATION OF THE LIDAR DEVICE — 704

DETECT, BY THE COMPUTING SYSTEM, A TRIGGER TO ENGAGE IN THE DROP PROCESS — 706

IN RESPONSE TO DETECTING THE TRIGGER, THE COMPUTING SYSTEM (I) USES THE DETERMINED INFORMATION AS BASIS TO DETERMINE A STRATEGY FOR THE DROP PROCESS, AND (II) ENGAGES IN THE DROP PROCESS IN ACCORDANCE WITH THE DETERMINED STRATEGY — 708

LIDAR device as a basis to determine the strategy for the drop process, and (ii) engage in the drop process in accordance with the determined strategy.

20 Claims, 9 Drawing Sheets

Related U.S. Application Data continuation of application No. 16/404,499, filed on May 6, 2019, now Pat. No. 11,604,284.

(51) Int. Cl.

| | | |
|---|---|---|
| *G01S 17/10* | (2020.01) | |
| *G01S 17/89* | (2020.01) | |
| *G05D 1/00* | (2024.01) | |
| *G05D 1/81* | (2024.01) | |

(58) Field of Classification Search

CPC ........ G01S 13/931; G01S 19/45; G01S 19/47; G05D 1/0088; G05D 1/81; G05D 1/0214; G05D 1/0223; Y02A 90/10; G01C 21/3415; G01C 21/165

USPC ................. 701/23; 348/14.13, 568; 382/232; 386/328; 379/93.08; 356/4.01; 710/68

See application file for complete search history.

(56) References Cited

U.S. PATENT DOCUMENTS

| | | | |
|---|---|---|---|
| 8,682,037 | B2 | 3/2014 | Crews |
| 9,121,703 | B1 | 9/2015 | Droz et al. |
| 9,305,241 | B2 | 4/2016 | Pope |
| 9,633,483 | B1 | 4/2017 | Xu et al. |
| 10,928,485 | B1 * | 2/2021 | Karadeniz ............... G01S 17/10 |
| 11,604,284 | B2 | 3/2023 | Gassend et al. |
| 12,044,781 | B2 | 7/2024 | Gassend et al. |

| | | | |
|---|---|---|---|
| 2010/0137003 | A1 | 6/2010 | Goldfarb |
| 2010/0217529 | A1 | 8/2010 | Stroila et al. |
| 2014/0180590 | A1 | 6/2014 | Stroila et al. |
| 2014/0236414 | A1 | 8/2014 | Droz et al. |
| 2015/0185325 | A1 | 7/2015 | Park et al. |
| 2016/0047903 | A1 | 2/2016 | Dussan |
| 2017/0075330 | A1 | 3/2017 | Matsunami et al. |
| 2017/0242108 | A1 | 8/2017 | Dussan et al. |
| 2017/0347122 | A1 | 11/2017 | Chou et al. |
| 2018/0038696 | A1 | 2/2018 | Fairgrieve |
| 2018/0194280 | A1 | 7/2018 | Shibata et al. |
| 2018/0203100 | A1 | 7/2018 | McKitterick |
| 2018/0307921 | A1 | 10/2018 | Vallespi-Gonzelez et al. |
| 2019/0042900 | A1 | 2/2019 | Smith et al. |
| 2019/0086511 | A1 | 3/2019 | Takeuchi et al. |
| 2019/0087979 | A1 | 3/2019 | Mammou et al. |
| 2019/0121348 | A1 | 4/2019 | Cella et al. |
| 2019/0277962 | A1 | 9/2019 | Ingram et al. |
| 2019/0339393 | A1 * | 11/2019 | Lingg .................... G01S 17/42 |
| 2020/0018854 | A1 * | 1/2020 | Hicks ................... G01S 7/4802 |
| 2020/0174156 | A1 | 6/2020 | Terefe |
| 2021/0286051 | A1 * | 9/2021 | Liu ........................... H03F 1/52 |
| 2021/0339738 | A1 | 11/2021 | Lashkari et al. |

FOREIGN PATENT DOCUMENTS

| | | |
|---|---|---|
| CN | 107076838 A | 8/2017 |
| EP | 2736017 A2 | 5/2014 |
| EP | 2749899 A2 | 7/2014 |
| EP | 3091512 A1 | 11/2016 |
| JP | 2015-197329 A | 11/2015 |
| JP | 2016-194481 A | 11/2016 |
| KR | 10-2015-0076760 A | 7/2015 |
| WO | 2018031562 A1 | 2/2018 |

OTHER PUBLICATIONS

International Search Report and Written Opinion from International Patent Application No. PCT/US2020/028964, dated Aug. 12, 2020.

* cited by examiner

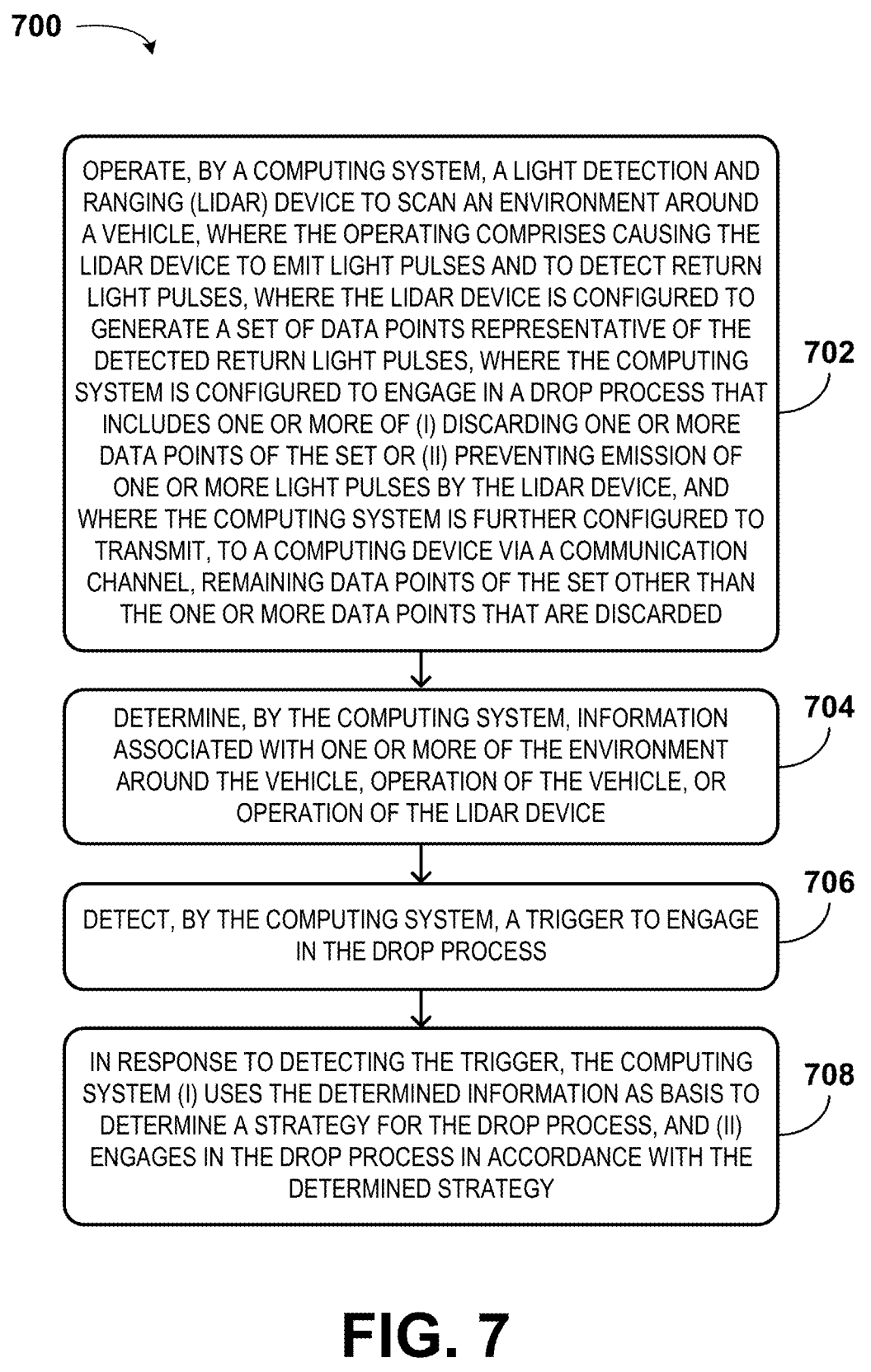

700

OPERATE, BY A COMPUTING SYSTEM, A LIGHT DETECTION AND RANGING (LIDAR) DEVICE TO SCAN AN ENVIRONMENT AROUND A VEHICLE, WHERE THE OPERATING COMPRISES CAUSING THE LIDAR DEVICE TO EMIT LIGHT PULSES AND TO DETECT RETURN LIGHT PULSES, WHERE THE LIDAR DEVICE IS CONFIGURED TO GENERATE A SET OF DATA POINTS REPRESENTATIVE OF THE DETECTED RETURN LIGHT PULSES, WHERE THE COMPUTING SYSTEM IS CONFIGURED TO ENGAGE IN A DROP PROCESS THAT INCLUDES ONE OR MORE OF (I) DISCARDING ONE OR MORE DATA POINTS OF THE SET OR (II) PREVENTING EMISSION OF ONE OR MORE LIGHT PULSES BY THE LIDAR DEVICE, AND WHERE THE COMPUTING SYSTEM IS FURTHER CONFIGURED TO TRANSMIT, TO A COMPUTING DEVICE VIA A COMMUNICATION CHANNEL, REMAINING DATA POINTS OF THE SET OTHER THAN THE ONE OR MORE DATA POINTS THAT ARE DISCARDED          702

DETERMINE, BY THE COMPUTING SYSTEM, INFORMATION ASSOCIATED WITH ONE OR MORE OF THE ENVIRONMENT AROUND THE VEHICLE, OPERATION OF THE VEHICLE, OR OPERATION OF THE LIDAR DEVICE          704

DETECT, BY THE COMPUTING SYSTEM, A TRIGGER TO ENGAGE IN THE DROP PROCESS          706

IN RESPONSE TO DETECTING THE TRIGGER, THE COMPUTING SYSTEM (I) USES THE DETERMINED INFORMATION AS BASIS TO DETERMINE A STRATEGY FOR THE DROP PROCESS, AND (II) ENGAGES IN THE DROP PROCESS IN ACCORDANCE WITH THE DETERMINED STRATEGY          708

FIG. 7

METHODS AND SYSTEMS TO DETERMINE A STRATEGY FOR A DROP PROCESS ASSOCIATED WITH A LIGHT DETECTION AND RANGING (LIDAR) DEVICE

CROSS-REFERENCE TO RELATED APPLICATIONS

This application is a continuation of U.S. patent application Ser. No. 18/166,550, filed Feb. 9, 2023, which is a continuation of U.S. patent application Ser. No. 16/404,499, filed May 6, 2019. The foregoing applications are incorporated herein by reference.

BACKGROUND

A vehicle can be configured to operate in an autonomous mode in which the vehicle navigates through an environment with little or no input from a human driver. Such an autonomous vehicle can include one or more sensors that are configured to detect information about the environment in which the vehicle operates. One such sensor is a light detection and ranging (LIDAR) device.

Generally, a LIDAR device can help estimate distance(s) to environmental features while scanning through a scene to assemble a "point cloud" indicative of reflective surfaces in the environment. Individual points in the point cloud can be determined by emitting a light pulse and detecting a returning light pulse, if any, reflected from an object in the environment, and determining the distance to the object according to the time delay between the emitted light pulse and the detection of the reflected returning light pulse. Moreover, a LIDAR generally includes laser transmitters or the like, which can be rapidly and repeatedly scanned across a scene to provide continuous real-time information on distances to reflective objects in the scene. With this arrangement, combining the measured distances and the orientation of the laser(s) while measuring each distance allows for associating a three-dimensional position with each returning light pulse. In this way, a three-dimensional map of points indicative of locations of reflective features in the environment can be generated for the entire scanning zone.

SUMMARY

A LIDAR device of a vehicle may be configured to generate data points to represent detected return light pulses, and a computing device associated with the vehicle may receive such data points via a bandwidth-limited communication channel. The computing device could receive the data points from a computing system associated with the LIDAR device, such as from an on-board computing system of the LIDAR device, among other options. The computing device could use the data points to analyze object(s) in the vehicle's environment, and could operate the vehicle according to that analysis.

In some situations, the LIDAR device may generate more data points than can be transmitted on the bandwidth-limited communication channel at a given time, which may lead to certain data points not being timely or successfully transmitted to the computing device associated with the vehicle. As a result, the computing device might not successfully receive certain data points that the computing device would otherwise use to determine information of interest about the vehicle's environment.

The present disclosure relates to determining a strategy for a drop process associated with a LIDAR device, which could help resolve congestion associated with the communication channel while still enabling the computing device to receive data points that can be used to determine information of interest about the vehicle's environment. The drop process may involve (i) discarding some data points that the LIDAR device generated to represent detected return light pulses and/or (ii) preventing emission of some light pulses by the LIDAR device in order to prevent generation of certain data points in the first place, thereby helping to reduce the extent of such data points set for transmission via the bandwidth-limited communication channel. Moreover, the strategy for the drop process could be determined based on analysis of the environment around the vehicle, operation of the vehicle, and/or operation of the LIDAR device, so as to facilitate intelligent selection of data points to be discarded and/or of light pulses for which emission is to be prevented.

Accordingly, the computing system associated with the LIDAR device could engage in the drop process based on the determined strategy, so that data points useful to the computing device are retained or otherwise generated, and that data points less useful to the computing device are discarded or otherwise not generated. In this way, the drop process can help to alleviate congestion associated with the communication channel.

In one aspect, a method is disclosed. The method may involve operating, by a computing system, a LIDAR device to scan an environment around a vehicle, where the operating comprises causing the LIDAR device to emit light pulses and to detect return light pulses, where the LIDAR device is configured to generate a set of data points representative of the detected return light pulses, where the computing system is configured to engage in a drop process that includes one or more of (i) discarding one or more data points of the set or (ii) preventing emission of one or more light pulses by the LIDAR device, and where the computing system is further configured to transmit, to a computing device via a communication channel, remaining data points of the set other than the one or more data points that are discarded. The method may also involve determining, by the computing system, information associated with one or more of the environment around the vehicle, operation of the vehicle, or operation of the LIDAR device. The method may additionally involve detecting, by the computing system, a trigger to engage in the drop process. The method may further involve, in response to detecting the trigger, the computing system (i) using the determined information as basis to determine a strategy for the drop process, and (ii) engaging in the drop process in accordance with the determined strategy.

In another aspect, a computing system is disclosed. The computing system may include one or more processors, a non-transitory computer readable medium, and program instructions stored on the non-transitory computer readable medium and executable by the one or more processors to perform operations. Specifically, the program instructions may be executable to operate a LIDAR device to scan an environment around a vehicle, where the operating comprises causing the LIDAR device to emit light pulses and to detect return light pulses, where the LIDAR device is configured to generate a set of data points representative of the detected return light pulses, where the computing system is configured to engage in a drop process that includes one or more of (i) discarding one or more data points of the set or (ii) preventing emission of one or more light pulses by the LIDAR device, and where the computing system is further configured to transmit, to a computing device via a communication channel, remaining data points of the set other than the one or more data points that are discarded. Also, the program instructions may be executable to determine information associated with one or more of the environment around the vehicle, operation of the vehicle, or operation of the LIDAR device. Additionally, the program instructions may be executable to detect a trigger to engage in the drop process. Further, the program instructions may be executable to, in response to detecting the trigger, (i) use the determined information as basis to determine a strategy for the drop process, and (ii) engage in the drop process in accordance with the determined strategy.

In yet another aspect, a vehicle is disclosed. The vehicle may include a LIDAR device, and a computing system configured to perform operations. Specifically, the computing system may be configured to operate the LIDAR device to scan an environment around a vehicle, where the operating comprises causing the LIDAR device to emit light pulses and to detect return light pulses, where the LIDAR device is configured to generate a set of data points representative of the detected return light pulses. Also, the computing system may be configured to determine information associated with one or more of the environment around the vehicle, operation of the vehicle, or operation of the LIDAR device. Additionally, the computing system may be configured to detect a trigger to engage in a drop process. Further, the computing system may be configured to, in response to detecting the trigger, use the determined information as basis to determine a strategy for the drop process, and engage in the drop process in accordance with the determined strategy, where the drop process includes one or more of (i) discarding one or more data points of the set or (ii) preventing emission of one or more light pulses by the LIDAR device.

In yet another aspect, a system is provided. The system may include means for operating a LIDAR device to scan an environment around a vehicle, where the operating comprises causing the LIDAR device to emit light pulses and to detect return light pulses, where the LIDAR device is configured to generate a set of data points representative of the detected return light pulses, where the computing system is configured to engage in a drop process that includes one or more of (i) discarding one or more data points of the set or (ii) preventing emission of one or more light pulses by the LIDAR device, and where the computing system is further configured to transmit, to a computing device via a communication channel, remaining data points of the set other than the one or more data points that are discarded. The system may also include means for determining information associated with one or more of the environment around the vehicle, operation of the vehicle, or operation of the LIDAR device. The system may additionally include means for detecting a trigger to engage in the drop process. The system may further include means for, in response to detecting the trigger, (i) using the determined information as basis to determine a strategy for the drop process, and (ii) engaging in the drop process in accordance with the determined strategy.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 7 is an illustration of a method, according to example embodiments.

DETAILED DESCRIPTION

Figure 1:
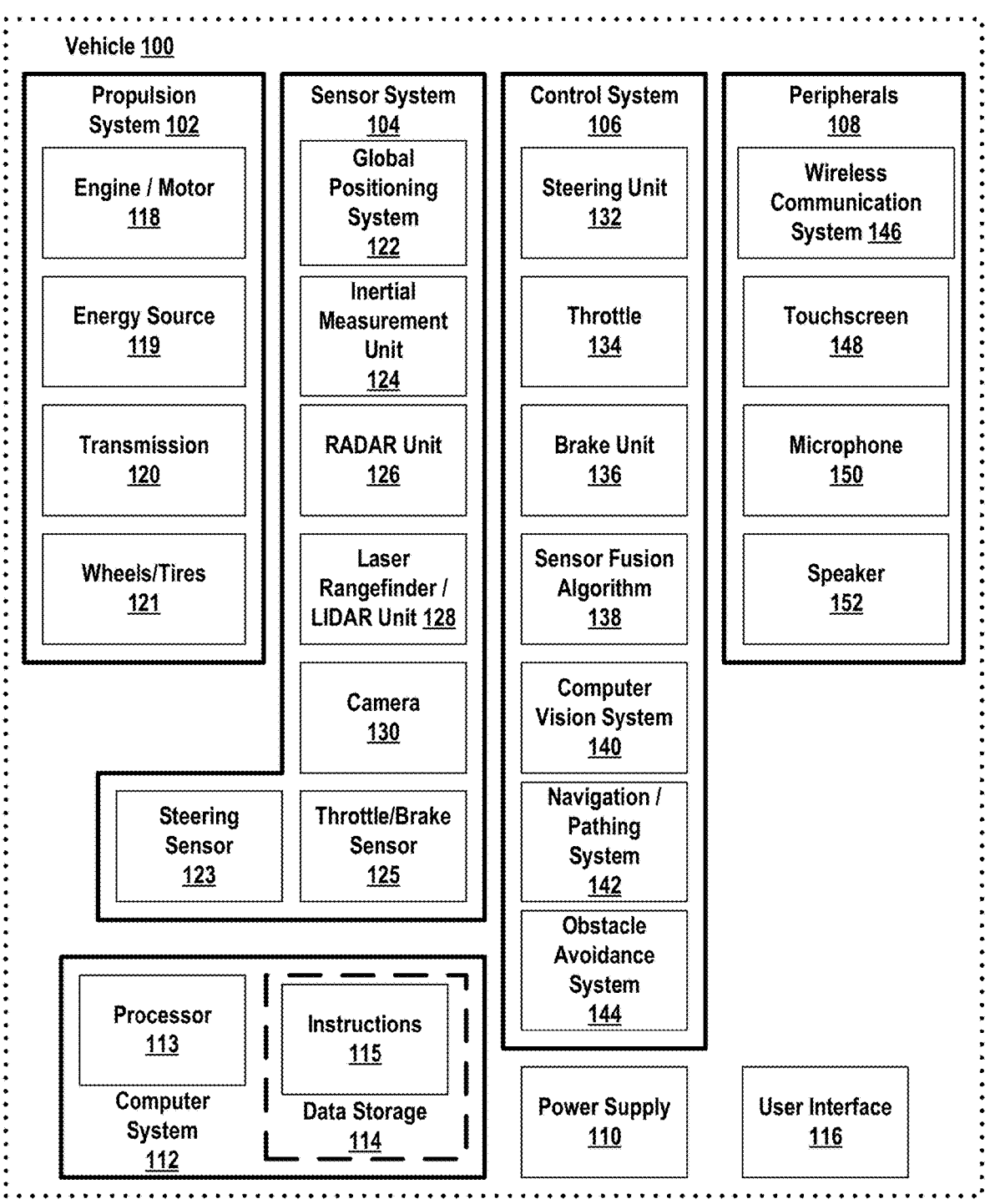
FIG. 1 is a functional block diagram illustrating a vehicle, according to example embodiments.
Figure 2A:
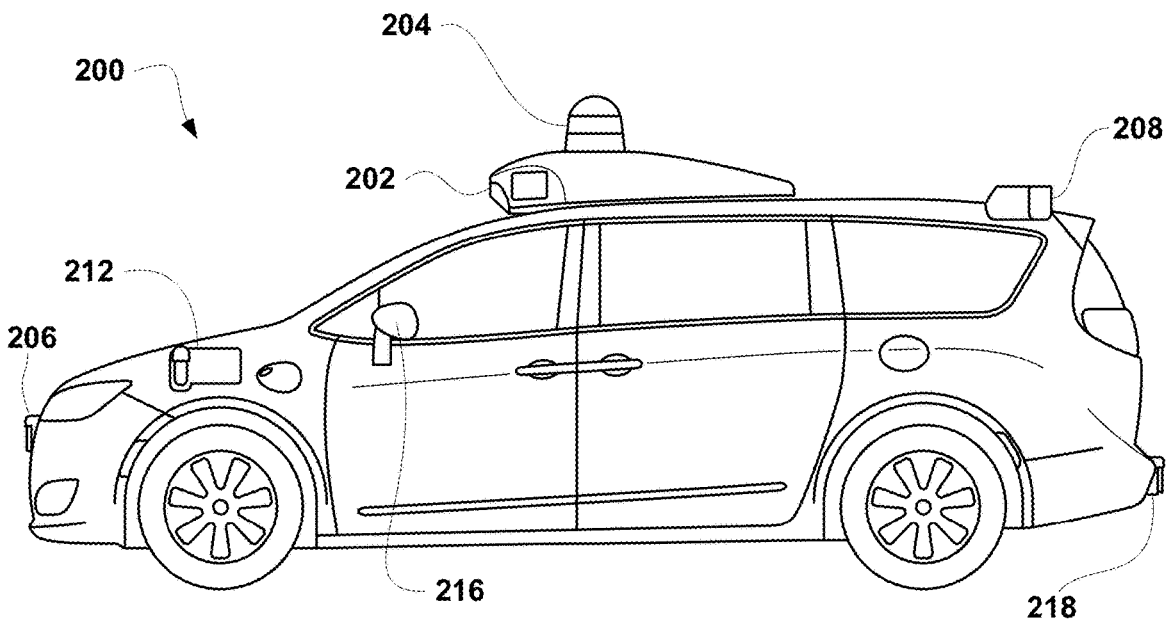
FIG. 2A is an illustration of a physical configuration of a vehicle, according to example embodiments.
Figure 2B:
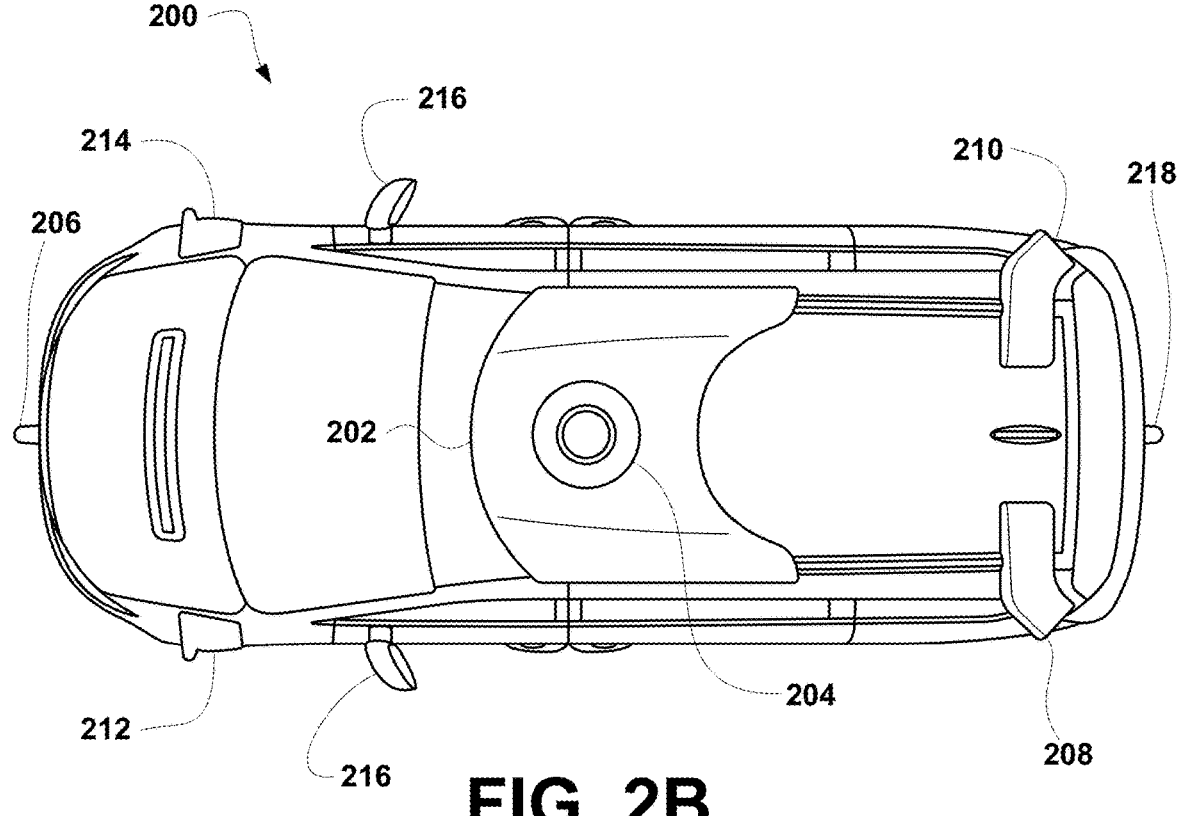
FIG. 2B is an illustration of a physical configuration of a vehicle, according to example embodiments.
Figure 2C:
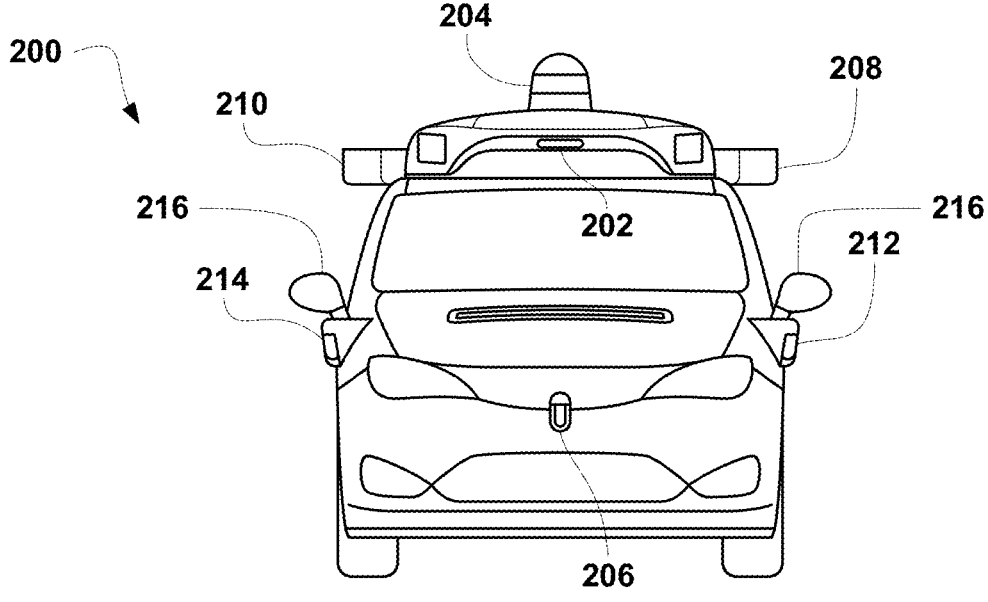
FIG. 2C is an illustration of a physical configuration of a vehicle, according to example embodiments.
Figure 2D:
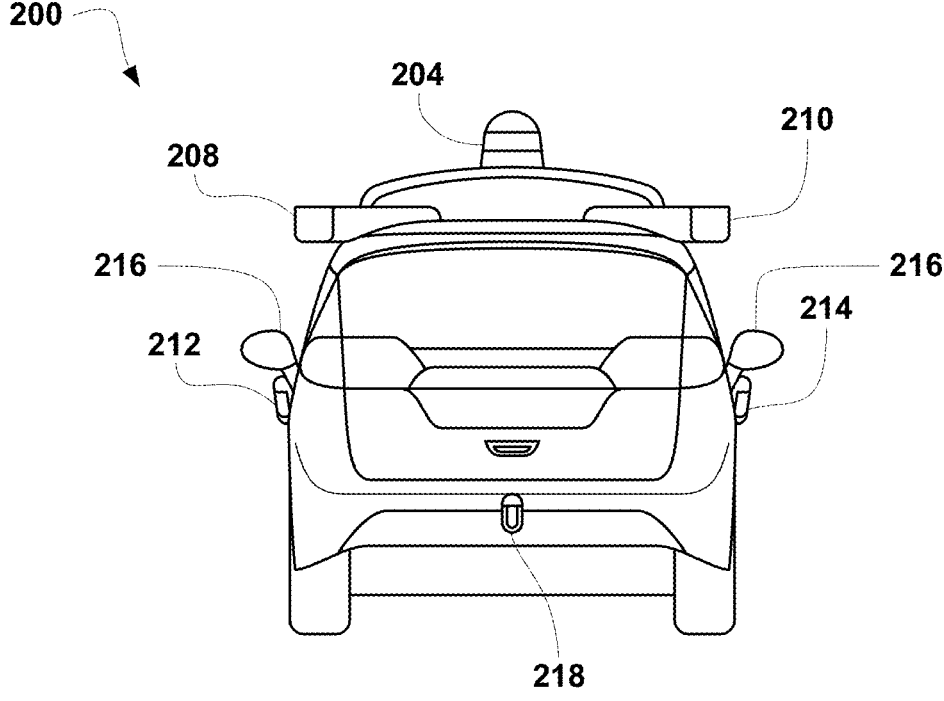
FIG. 2D is an illustration of a physical configuration of a vehicle, according to example embodiments.
Figure 2E:
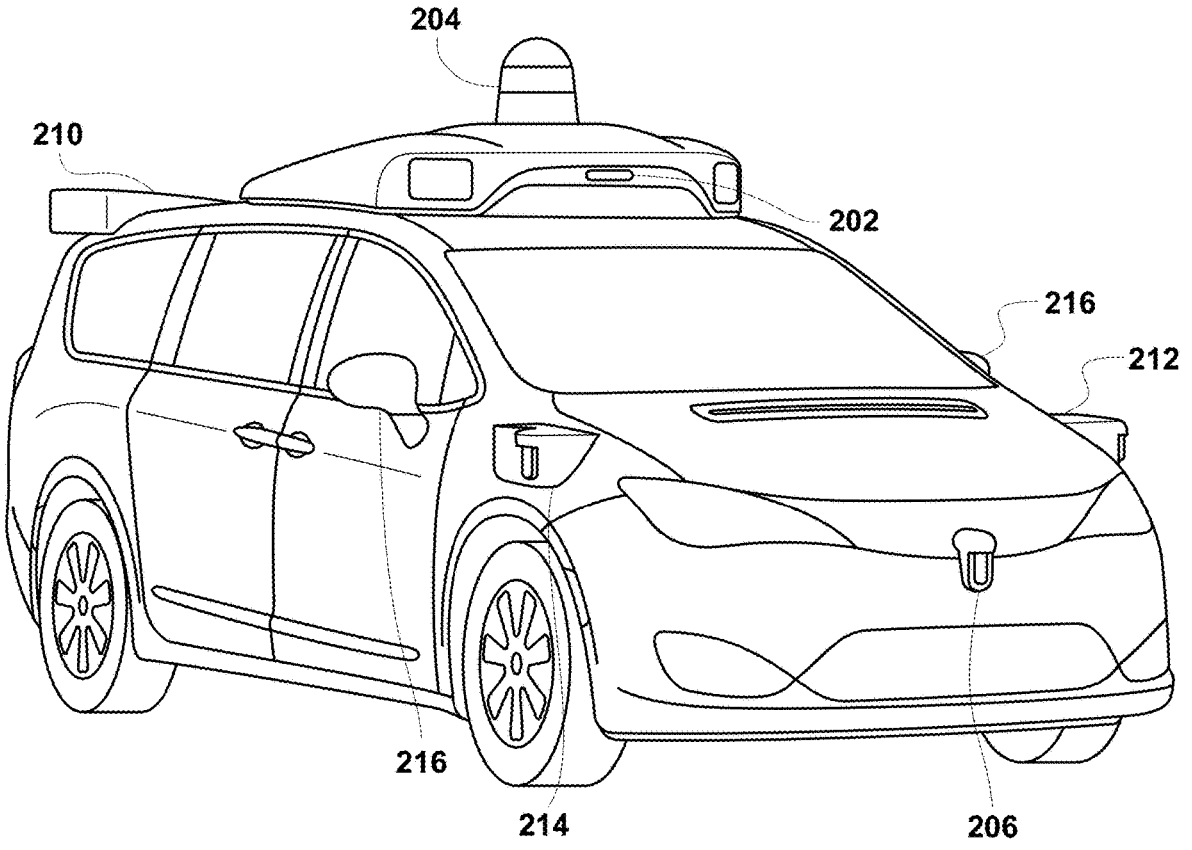
FIG. 2E is an illustration of a physical configuration of a vehicle, according to example embodiments.

Example methods and systems are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

I. Overview

A LIDAR device can estimate distance(s) to environmental features while scanning through a scene to assemble a "point cloud" indicative of the reflectivity of surfaces in the environment. Individual points in the point cloud can be determined by emitting a light pulse and detecting a returning light pulse, if any, reflected from an object in the environment, and determining the distance to the object according to the time delay between the emitted light pulse and the detection of the reflected returning light pulse.

In practice, a LIDAR device could be used for various purposes. By way of example, a vehicle can be configured to operate in an autonomous mode in which the vehicle navigates through an environment with little or no input from a human driver. And such an autonomous vehicle can include (i) a LIDAR device configured to generate information about the vehicle's environment, and (ii) a computing device that uses the information from the LIDAR device.

More specifically, the computing device of the vehicle could receive data points generated by a LIDAR device to represent detected return light pulses. This computing device could use the data points to determine information about objects in the vehicle's environment, and perhaps could also operate the vehicle according to that information. Moreover, the computing device of the vehicle could receive the data points from a computing system associated with the LIDAR device (e.g., a computing system on-board the LIDAR device), such as via a wired or wireless communication channel.

Unfortunately, however, the communication channel may have limited bandwidth, which could lead to various challenges. For example, if the number of data points generated by the LIDAR device at a given time exceeds the total available bandwidth of the communication channel, such a scenario may lead to an "overfill" state in which some of the data points are timely and successfully transmitted to the computing device and in which other data points are not timely and/or successfully transmitted to the computing device. As a result, the computing device of the vehicle may end up not receiving certain data points that the computing device would otherwise use to determine information of interest about the vehicle's environment, which could in turn present challenges to smooth operation of the vehicle in autonomous mode and/or other challenges.

To help overcome such challenges, the computing system associated with the LIDAR device could engage in a drop process. The drop process may involve (i) discarding some data points that the LIDAR device generated to represent detected return light pulses and/or (ii) preventing emission of some light pulses by the LIDAR device in order to prevent generation of certain data points in the first place. As a result, the drop process could reduce the extent of such data points set for transmission via the communication channel, thereby helping to avoid or minimize the overfill state of the bandwidth-limited communication channel.

Although such a drop process is beneficial, the drop process could have deficiencies if the drop process is carried out without an intelligent strategy (e.g., a strategy that discards data points that are less useful and retains data points that are more useful). For example, if the computing system of the LIDAR device engages in the drop process without an intelligent strategy, the computing system may end up discarding and/or preventing generation of data points that the computing device would otherwise use to determine information of interest about the vehicle's environment. Additionally, if the computing system of the LIDAR device engages in the drop process without an intelligent strategy, the computing system may transmit, to the computing device via the communication channel, data points that might not contain information of interest, thereby unnecessarily increasing bandwidth consumption of the communication channel.

According to the present disclosure, the computing system could dynamically determine a strategy for the drop process. Namely, rather than discarding and/or preventing generation of data points without an intelligent strategy or in a static manner that does not take into account a vehicle's changing environment and/or operational state, the computing system could determine a strategy for the drop process based on an analysis of the environment around the vehicle, operation of the vehicle, and/or operation of the LIDAR device. The computing system could carry out such an analysis to effectively select data points to be discarded and/or light pulses for which emission is to be prevented. Moreover, the computing system could carry out such an analysis continuously or from time-to-time, so that the computing system could adjust the strategy for the drop process on an as-needed basis over time.

In this way, when the computing system engages in the drop process based on an intelligent strategy (e.g., a strategy that takes into account the environment around the vehicle, operation of the vehicle, and/or operation of the LIDAR device), the computing system would discard and/or prevent generation of data points less useful to the computing device of the vehicle, and would retain and/or otherwise ensure generation of data points more useful to the computing device of the vehicle, thereby helping to alleviate congestion associated with the communication channel.

As such, the present disclosure contemplates various methods and systems to determine a strategy for the drop process, so that the computing system associated with the LIDAR device could engage in the drop process based on the strategy in order to provide the various benefits described herein, among other benefits.

II. Example Systems

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/LIDAR 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/LIDAR 128 may include one or more photodetectors. Such photodetectors may be especially sensitive detectors (e.g., avalanche photodiodes (APDs)). In some examples, such photodetectors may even be capable of detecting single photons (e.g., single-photon avalanche diodes (SPADs)). Further, such photodetectors can be arranged (e.g., through an electrical connection in series) into an array (e.g., as in a silicon photomultiplier (SiPM)).

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or 4G cellular communication, such as worldwide interoperability for microwave access (WiMAX) or long-term evolution (LTE). Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 that can include some or all of the functions described in connection with vehicle 100 in reference to FIG. 1. Although vehicle 200 is illustrated in FIGS. 2A-2E as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first LIDAR unit 204, a second LIDAR unit 206, a first radar unit 208, a second radar unit 210, a first LIDAR/radar unit 212, a second LIDAR/radar unit 214, and two additional locations 216, 218 at which a radar unit, LIDAR unit, laser rangefinder unit, and/or other type of sensor or sensor(s) could be located on the vehicle 200. Each of the first LIDAR/radar unit 212 and the second LIDAR/radar unit 214 can take the form of a LIDAR unit, a radar unit, or both.

Furthermore, the example vehicle 200 can include any of the components described in connection with vehicle 100 of FIG. 1. The first and second radar units 208, 210 and/or the first and second LIDAR units 204, 206 can actively scan the surrounding environment for the presence of potential obstacles and can be similar to the radar 126 and/or laser rangefinder/LIDAR 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths. The sensor unit 202 could be mounted atop the roof of a car, although other mounting locations are possible.

Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the environment near the back of the vehicle 200 for the presence of radio-reflective objects. Similarly, the first LIDAR/radar unit 212 and the second LIDAR/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
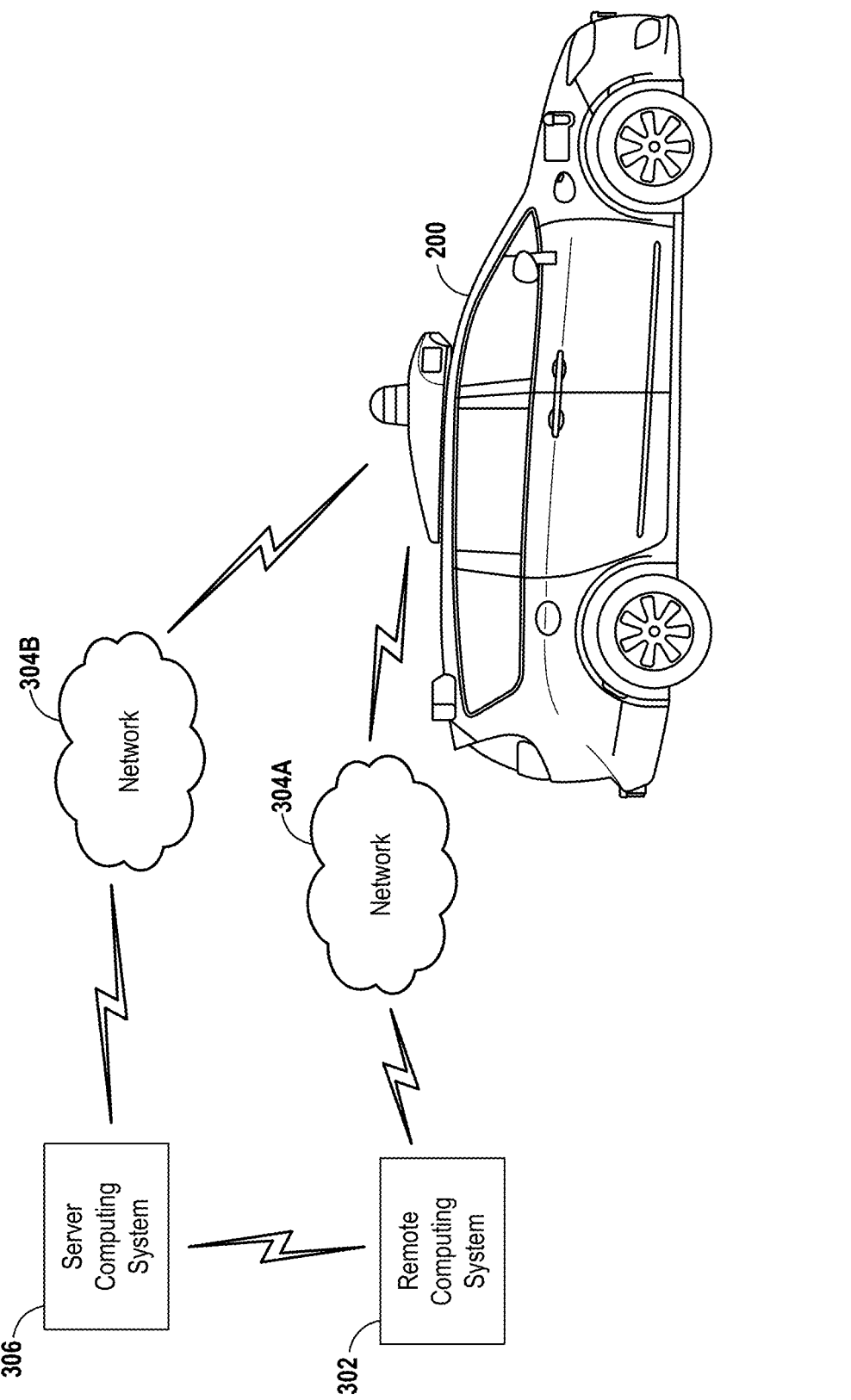
FIG. 3 is a conceptual illustration of wireless communication between various computing systems related to an autonomous vehicle, according to example embodiments.

FIG. 3 is a conceptual illustration of wireless communication between various computing systems related to an autonomous vehicle, according to example embodiments. In particular, wireless communication may occur between remote computing system 302 and vehicle 200 via network 304A. Also, wireless communication may occur between server computing system 306 and vehicle 200 via network 304B. Further, wireless communication may occur between server computing system 306 and remote computing system 302 (e.g., via network 304A, network 304B, and/or another network).

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304A represents infrastructure that enables wireless communication between remote computing system 302 and vehicle 200, and network 304B represents infrastructure that enables wireless communication between server computing system 306 and vehicle 200. In some implementations, network 304A could also enable wireless communication between server computing system 306 and remote computing system 302, and/or between server computing system 306 and vehicle 200. Additionally or alternatively, in some implementations, network 304B could also enable wireless communication between server computing system 306 and remote computing system 302, and/or between remote computing system 302 and vehicle 200.

The position of remote computing system 302 can vary within examples. For instance, remote computing system 302 may have a remote position from vehicle 200 that has a wireless communication via network 304A. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the environment of an autonomous vehicle. In general, at least one computing system will be able to analyze the images and possibly control the autonomous vehicle.

In some embodiments, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., infrared light, such as that from a gas or diode laser, or other possible light source) that will be reflected by target objects near the vehicle. The laser range finder may be able to capture the reflected electromagnetic (e.g., laser) signals. The captured reflected electromagnetic signals may enable the range-finding system (or processing system) to determine a range to various objects. The laser range finder may also be able to determine a velocity or speed of target objects and store it as environment data.

Additionally, in an example, a microphone may be configured to capture audio of environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the environment of the vehicle. For example, the processing system may combine data from both radar information and a captured image to determine if another vehicle or pedestrian is in front of the autonomous vehicle. In other embodiments, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some embodiments, the environment data may come from a camera and be image or video data. In other embodiments, the environment data may come from a LIDAR unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the environment, it may also calculate a confidence associated with the specific detected object. The confidence may be calculated in various ways depending on the embodiment. In one example, when detecting objects of the environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304A), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

III. Example Arrangement of a LIDAR Device

Figure 4:
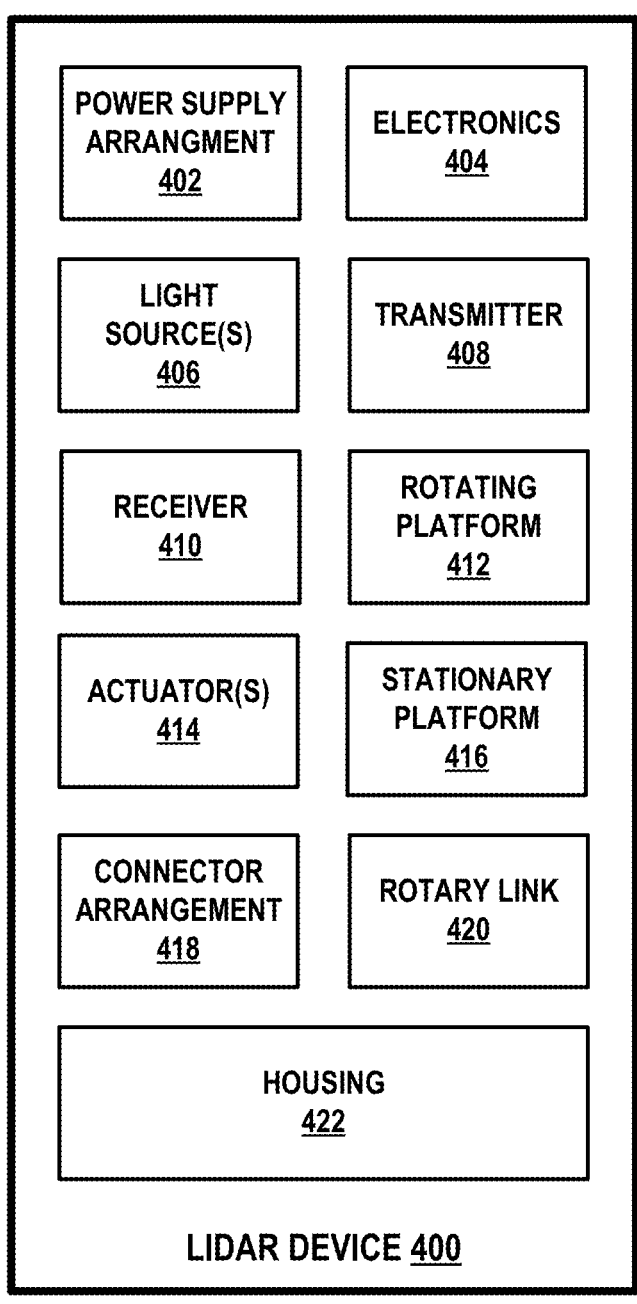
FIG. 4 is a simplified block diagram of a LIDAR device, according to an example embodiment.

FIG. 4 is next a simplified block diagram of a LIDAR device 400, according to an example embodiment. In practice, LIDAR device 400 could be part of laser rangefinder/LIDAR 128 described herein, among other possibilities.

As shown, the LIDAR device 400 includes a power supply arrangement 402, electronics 404, light source(s) 406, at least one transmitter 408, at least one receiver 410, a rotating platform 412, actuator(s) 414, a stationary platform 416, a connector arrangement 418, a rotary link 420, and a housing 422. In other embodiments, the LIDAR device 400 may include more, fewer, or different components. Additionally, the components shown may be combined or divided in any number of ways.

Power supply arrangement 402 may be configured to supply power to various components of the LIDAR device 400. In particular, the power supply arrangement 402 may include or otherwise take the form of at least one power source disposed within the LIDAR device 400 and connected to various components of the LIDAR device 400 in any feasible manner, so as to supply power to those components. Additionally or alternatively, the power supply arrangement 402 may include or otherwise take the form of a power adapter or the like that is configured to receive power from one or more external power sources (e.g., from a power source arranged in a vehicle to which the LIDAR device 400 is coupled) and to supply that received power to various components of the LIDAR device 400 in any feasible manner. In either case, any type of power source may be used such as, for example, a battery.

Electronics 404 may include one or more electronic components and/or systems each arranged to help facilitate certain respective operations of the LIDAR device 400. In practice, these electronics 404 may be disposed within the LIDAR device 400 in any feasible manner. For instance, at least some of the electronics 404 may be disposed within a central cavity region of the rotary link 420. Nonetheless, the electronics 404 may include various types of electronic components and/or systems.

For example, the electronics 404 may include various wirings used for transfer of control signals from a computing system to various components of the LIDAR device 400 and/or for transfer of data from various components of the LIDAR device 400 to the computing system. Generally, the data that the computing system receives may include sensor data based on detections of light by the receiver 410, among other possibilities. Moreover, the control signals sent by the computing system may operate various components of the LIDAR device 400, such as by controlling emission of light by the transmitter 406, controlling detection of light by the receiver 410, and/or controlling the actuator(s) 414 to rotate the rotating platform 412, among other possibilities.

In some arrangements, the electronics 404 may also include a computing system. This computing system may have one or more processors, data storage, and program instructions stored on the data storage and executable by the one or more processor to facilitate various operations. With this arrangement, the computing system may thus be configured to carry operations described herein, such as those of methods described below. Additionally or alternatively, the computing system may communicate with an external computing system, control system, or the like (e.g., a computing system arranged in a vehicle to which the LIDAR device 400 is coupled) so as to help facilitate transfer of control signals and/or data between the external system and various components of the LIDAR device 400.

In other arrangements, however, the electronics 404 may not include a computing system. Rather, at least some of the above-mentioned wirings may be used for connectivity to an external computing system. With this arrangement, the wirings may help facilitate transfer of control signals and/or data between the external computing system and the various components of the LIDAR device 400. Other arrangements are possible as well.

Further, one or more light sources 406 can be configured to emit, respectively, a plurality of light beams and/or pulses having wavelengths within a wavelength range. The wavelength range could, for example, be in the ultraviolet, visible, and/or infrared portions of the electromagnetic spectrum. In some examples, the wavelength range can be a narrow wavelength range, such as provided by lasers.

In practice, one of the light sources 406 may be a laser diode configured to emit pulses of light. In particular, a laser diode may be a semiconductor device including a p-n junction with an active region in which oppositely polarized, energized charge carriers (e.g., free electrons and/or holes) recombine while current flows through the device across the p-n junction. The recombination results in emission of light due to a change in energy state of the charge carriers. When the active region is heavily populated by such energized pairs (e.g., the active region may have a population inversion of energized states), stimulated emission across the active region may produce a substantially coherent wave front of light that is then emitted from the laser diode. Recombination events, and the resulting light emission, occur in response to current flowing through the device, and so applying a pulse of current to the laser diode results in emission of a pulse of light from the laser diode.

As such, the present disclosure will be generally described herein in the context of a laser diode being used as the primary light source 406. In some arrangements, however, the one or more light sources 406 may additionally or alternatively include fiber lasers, light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), and/or any other device configured to selectively transmit, reflect, and/or emit light to provide the plurality of emitted light beams and/or pulses.

Furthermore, transmitter 408 may be configured to emit light into an environment. In particular, the transmitter 408 may include an optical arrangement that is arranged to direct light from a light source 406 toward the environment. This optical arrangement may include any feasible combination of mirror(s) used to guide propagation of the light throughout physical space and/or lens(es) used to adjust certain characteristics of the light, among other optical components. For instance, the optical arrangement may include a transmit lens arranged to collimate the light, thereby resulting in light having rays that are substantially parallel to one another. Moreover, the lens may be shaped to spread or otherwise scatter light in a particular manner, such as by causing the vertical light spread of $+7°$ away from a horizontal axis to $-18°$ away from the horizontal axis (e.g., the horizontal axis ideally being parallel to a ground surface in the environment) for example.

As noted, the LIDAR device 400 may include at least one receiver 410. The receiver 410 may be respectively configured to at least detect light having wavelengths in the same wavelength range as the one of the light emitted from the transmitter 408. In doing so, the receiver 410 may detect light with a particular resolution. For example, the receiver 410 may be configured to detect light with a $0.036°$ (horizontal)$\times 0.067°$ (vertical) angular resolution. Moreover, the receiver 410 may be configured to scan the environment with a particular FOV. For example, the receiver 410 may be arranged to focus incoming light within a range of $+7°$ away from the above-mentioned horizontal axis to $-18°$ away from the horizontal axis. In this way, the receiver 410 allows for detection of light along a range of $+7°$ to $-18°$, which matches the above-mentioned exemplary vertical spread of emitted light that the transmitter 408 provides. It is noted that this resolution and FOV are described for exemplary purposes only and are not meant to be limiting.

In an example implementation, the receiver 410 may have an optical arrangement that allows the receiver 410 to provide the resolution and FOV as described above. Generally, such an optical arrangement may be arranged to provide an optical path between at least one optical lens and a photodetector array.

More specifically, the receiver 410 may include an optical lens arranged to focus light reflected from one or more objects in the environment of the LIDAR device 400 onto detectors of the receiver 410. To do so, the optical lens may have certain dimensions (e.g., approximately 10 cm×5 cm) as well as a certain focal length (e.g., approximately 35 cm). Moreover, the optical lens may be shaped so as to focus incoming light along a particular vertical FOV as described above (e.g., $+7°$ to $-18°$). Such shaping of the first receiver's optical lens may take on one of various forms (e.g., spherical shaping) without departing from the scope of the present disclosure.

Furthermore, as noted, the receiver 410 may have a photodetector array, which may include two or more detectors each configured to convert detected light (e.g., in the above-mentioned wavelength range) into an electrical signal indicative of the detected light. In practice, such a photodetector array could be arranged in one of various ways. For example, the detectors can be disposed on one or more substrates (e.g., printed circuit boards (PCBs), flexible PCBs, etc.) and arranged to detect incoming light that is traveling along the optical path from the optical lens. Also, such a photodetector array could include any feasible number of detectors aligned in any feasible manner. For example, the photodetector array may include a 13×16 array of detectors. It is noted that this photodetector array is described for exemplary purposes only and is not meant to be limiting.

Generally, the detectors of the array may take various forms. For example, the detectors may take the form of photodiodes, avalanche photodiodes (e.g., geiger mode and/or linear mode avalanche photodiodes), phototransistors, cameras, active pixel sensors (APS), charge coupled devices (CCD), cryogenic detectors, and/or any other sensor of light configured to receive focused light having wavelengths in the wavelength range of the emitted light. Other examples are possible as well.

Further, as noted, the LIDAR device 400 may include a rotating platform 412 that is configured to rotate about an axis. In order to rotate in this manner, one or more actuators 414 may actuate the rotating platform 412. In practice, these actuators 414 may include motors, pneumatic actuators, hydraulic pistons, and/or piezoelectric actuators, among other possibilities.

In an example implementation, the transmitter 408 and the receiver 410 may be arranged on the rotating platform 412 such that each of these components moves relative to the environment based on rotation of the rotating platform 412. In particular, each of these components could be rotated relative to an axis so that the LIDAR device 400 may obtain information from various directions. In this manner, the LIDAR device 400 may have a horizontal viewing direction that can be adjusted by actuating the rotating platform 412 to different directions.

With this arrangement, a computing system could direct an actuator 414 to rotate the rotating platform 412 in various ways so as to obtain information about the environment in various ways. In particular, the rotating platform 412 could rotate at various extents and in either direction. For example, the rotating platform 412 may carry out full revolutions such that the LIDAR device 400 provides a 360° horizontal FOV of the environment. Thus, given that the receiver 410 may rotate based on rotation of the rotating platform 412, the receiver 410 may have a horizontal FOV (e.g., 360° or less) and also a vertical FOV as described above.

Moreover, the rotating platform 412 could rotate at various rates so as to cause LIDAR device 400 to scan the environment at various refresh rates. For example, the LIDAR device 400 may be configured to have a refresh rate of 15 Hz (e.g., fifteen complete rotations of the LIDAR device 400 per second). In this example, assuming that the LIDAR device 400 is coupled to a vehicle as further described below, the scanning thus involves scanning a 360° FOV around the vehicle fifteen times every second. Other examples are also possible. For example, the rotating platform 412 could swivel the LIDAR device so that it scans back and forth within a smaller angle horizontal FOV.

Yet further, as noted, the LIDAR device 400 may include a stationary platform 416. In practice, the stationary platform 416 may take on any shape or form and may be configured for coupling to various structures, such as to a top of a vehicle for example. Also, the coupling of the stationary platform 416 may be carried out via any feasible connector arrangement 418 (e.g., bolts, screws, and/or adhesives). In this way, the LIDAR device 400 could be coupled to a structure so as to be used for various purposes, such as those described herein.

Furthermore, the LIDAR device 400 may also include a rotary link 420 that directly or indirectly couples the stationary platform 416 to the rotating platform 412. Specifically, the rotary link 420 may take on any shape, form and material that provides for rotation of the rotating platform 412 about an axis relative to the stationary platform 416. For instance, the rotary link 420 may take the form of a shaft or the like that rotates based on actuation from an actuator 414, thereby transferring mechanical forces from the actuator 414 to the rotating platform 412. Moreover, as noted, the rotary link 420 may have a central cavity in which electronics 404 and/or one or more other components of the LIDAR device 400 may be disposed. Other arrangements are possible as well.

Yet further, as noted, the LIDAR device 400 may include a housing 422. In practice, the housing 422 may take on any shape and form. For example, the housing 422 can be a dome-shaped housing, among other possibilities. Moreover, the housing 422 may be arranged in various ways relative to other components of the LIDAR device 400. It is noted that this housing is described for exemplary purposes only and is not meant to be limiting.

In an example implementation, the housing 422 may be coupled to the rotating platform 412 such that the housing 422 is configured to rotate about the above-mentioned axis based on rotation of the rotating platform 412. With this implementation, the transmitter 408, the receiver 410, and possibly other components of the LIDAR device 400 may each be disposed within the housing 422. In this manner, the transmitter 408 and the receiver 410 may rotate along with this housing 422 while being disposed within the housing 422.

Moreover, the housing 422 may have an aperture formed thereon, which could take on any feasible shape and size. In this regard, the transmitter 408 could be arranged within the housing 422 so as to emit light into the environment through the aperture. In this way, the transmitter 408 may rotate along with the aperture due to corresponding rotation of the housing 422, thereby allowing for emission of light into various directions. Also, the receiver 410 could be arranged within the housing 422 so as to detect light that enters the housing 422 from the environment through the aperture. In this way, the receiver 410 may rotate along with the aperture due to corresponding rotating of the housing 422, thereby allowing for detection of the light incoming from various directions along the horizontal FOV.

Yet further, the housing 422 may be composed of a material that is at least partially non-transparent, except for the aperture, which could be composed of a transparent material. In this way, light could propagate through the aperture, thereby allowing for scanning of the environment. But due to the housing 422 being at least partially non-transparent, the housing 422 may block at least some light from entering the interior space of the housing 422 and thus may help mitigate thermal effects. For instance, the housing 422 may block sun rays from entering the interior space of the housing 422, which may help avoid overheating of various components of the LIDAR device 400 due to those sun rays. Moreover, due to various components of the LIDAR device 400 being disposed within the housing 422 and due to the housing 422 rotating along with those components, the housing 422 may help protect those components from various environmental hazards, such as rain and/or snow, among others.

In other implementations, however, the housing 422 may be an exterior stationary housing that does not rotate with the LIDAR device 400. For example, the exterior stationary housing could be coupled to a vehicle and the LIDAR device could also be coupled to the vehicle while being configured to rotate within the exterior stationary housing. In this situation, the exterior stationary housing would likely be transparent so as to allow for propagation of light through the exterior stationary housing and thus for scanning of the environment by the LIDAR device 400. Moreover, the LIDAR device 400 may also include an aperture through which light may propagate and such an aperture may be on an interior housing of the LIDAR device 400, which may rotate within the exterior stationary housing along with other components of the LIDAR device 400. Other implementations are possible as well.

IV. Determining a Strategy for a Drop Process
Associated with a LIDAR Device

As noted above, the present disclosure relates to determining a strategy for a drop process associated with a LIDAR device (e.g., LIDAR device 400). In particular, a computing system associated with the LIDAR device may carry out the drop process, so as to help alleviate congestion of a bandwidth-limited communication channel. This communication channel may be one through which a computing device associated with the vehicle receives, from the computing system associated with the LIDAR device, data points generated by the LIDAR device to represent detected return light pulses. Moreover, the computing system may carry out the drop process according to a dynamically determined strategy, rather than according to a fixed strategy or without a strategy, so as to facilitate intelligent selection of data points to be discarded and/or of light pulses for which emission is to be prevented.

In practice, the computing device associated with the vehicle could be any computing device that might receive data points generated by the LIDAR device via the communication channel. For example, the computing device at issue could include or be a part of any one of the above-described subsystems of vehicle 100, such as propulsion system 102, sensor system 104, control system 106, peripherals 108, power supply 110, computer system 112, data storage 114, and/or user interface 116, for instance. In another example, the computing device at issue could be a computing device external to the vehicle, such as remote computing system 302 or server computing system 306, for instance. Other examples are also possible.

Further, the computing system that carries out the drop process according to the determined strategy could be any computing system associated with the LIDAR device. For example, the computing system at issue could be a computing system on-board the LIDAR device, such as a computing system that is part of electronics 404 of LIDAR device 400, for instance. In another example, the computing system at issue could be a computing system that is external to the LIDAR device, such as a computing system that communicates data to and/or receives data from components of LIDAR device 400 via electronics 404, for instance. Moreover, the computing system at issue could be a computing system that receives data points directly from the LIDAR device, and then transmits the data points to the computing device either directly or via intermediary computing system(s) residing on the above-mentioned communication channel. And in some cases, the computing system at issue could be one of those intermediary computing system(s). In yet another example, one or more processor(s) of the LIDAR device 400 could carry out the drop process according to the determined strategy, so as to help alleviate congestion of a communication channel between those processor(s) and another entity (e.g., a computing system that receives data points directly from the LIDAR device or an intermediary computing system). Other examples are also possible.

Figure 5:
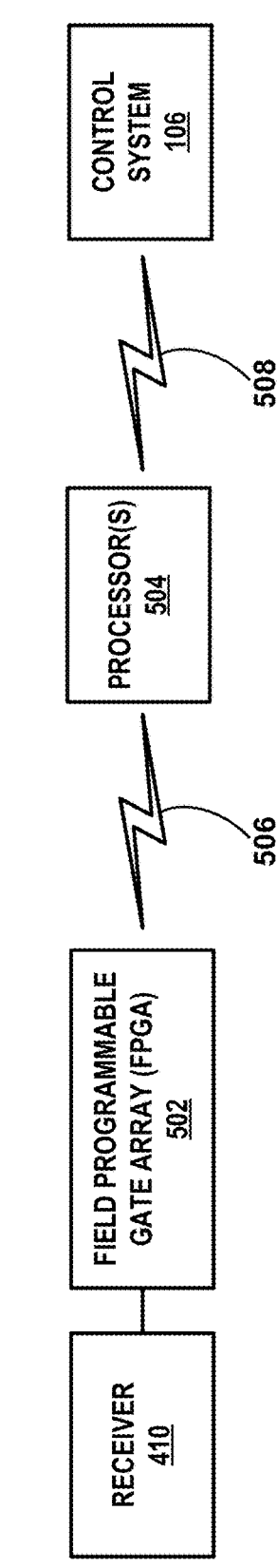
FIG. 5 is an illustration of an example arrangement in which a drop process can be carried out based on a dynamically determined strategy, according to example embodiments.

FIG. 5 illustrates an example arrangement 500 in which a drop process can be carried out according to a determined strategy. As shown, the arrangement 500 includes the receiver 410 of LIDAR device 400, a field programmable gate array (FPGA) 502, processor(s) 504, and the control system 106. In this arrangement 500, the FPGA 502 may be on-board the LIDAR device 400 and may be configured to process data (e.g., waveform(s)) provided by the receiver 410 according to detection of return light pulses. Once the data is processed, the FPGA 502 may transmit, to processor(s) 504 via communication link 506 (e.g., a network), data points representative of detected return light pulses. In turn, the processor(s) 504 could further process or otherwise refine the data points, and could then provide the refined data points to the control system 106 via another communication link 508. The control system 106 could then use the data points as described herein, such as for analyzing object(s) in the vehicle's environment, and perhaps operating the vehicle according to that analysis, among other options.

In arrangement 500, various entities could be the above-mentioned computing system associated with the LIDAR device, and various entities could be the above-mentioned computing device associated with the vehicle, in accordance with the present disclosure. For example, the FPGA 502 could be the computing system that carries out the drop process according to a determined strategy, and the processor(s) 504 and/or the control system 106 could be considered as the computing device associated with the vehicle. In this example, the FPGA 502 could engage in the drop process to alleviate congestion associated with the communication channel 506 and/or with communication channel 508. In another example, the processor(s) 504 could be the computing system that carries out the drop process according to a determined strategy, and control system 106 could be the computing device associated with the vehicle. In this example, the processor(s) 504 could engage in the drop process to alleviate congestion associated with the communication channel 508. Other examples are also possible.

In some implementations, certain entities in arrangement 500 could coordinate with one another to help facilitate aspects of the present disclosure. By way of example, the processor(s) 504 could determine the strategy for the drop process as described herein, and the processor(s) 504 could then transmit, to the FPGA 502, a communication indicating the determined strategy. In turn, the FPGA 502 could responsively carry out the drop process according to the indicated strategy. As such, in this example, the processor(s) 504 and the FPGA 502 could be considered as both being part of the above-mentioned computing system associated with the LIDAR device. Other examples are also possible.

According to the present disclosure, the computing system could determine information associated with the environment around the vehicle, operation of the vehicle, and/or operation of the LIDAR device, and, in response to detecting a trigger to engage in the drop process, could (i) use the determined information as basis to determine a strategy for the drop process and (ii) engage in the drop process in accordance with the determined strategy.

As discussed, the drop process may involves (i) discarding some data points that the LIDAR device generated to represent detected return light pulses and/or (ii) preventing emission of some light pulses by the LIDAR device in order to prevent generation of certain data points in the first place. In practice, discarding of data points may involve deleting data point(s) and/or temporarily storing the data point(s) in a data storage device (e.g., a buffer) for future evaluation or deletion of those data point(s), among other options. Also, preventing emission of light pulses could involve forgoing transmission of control signal(s) that direct emission of certain light pulse(s) and/or could involve transmission of control signal(s) that explicitly direct the LIDAR device to not emit certain light pulses, among other options.

Given this, the drop process could help reduce bandwidth consumption of the communication channel to be below a predefined threshold level and/or could maintain the bandwidth consumption below this threshold. This bandwidth consumption may relate to (i) an extent to which a total bandwidth of the communication channel is used up and/or (ii) an extent by which transmittable data exceeds the total bandwidth (e.g., during the above-mentioned "overfill" state in which the LIDAR device generates a relatively large extent of data points). Also, the threshold at issue may be defined to be a bandwidth level that is at or below the total bandwidth, so that the drop process reduces or maintains the extent of used up bandwidth to be at or below the total bandwidth. In other implementations, however, the threshold may be defined to be a bandwidth level that is above the total bandwidth, so as to permit but limit the overfill state. As such, the extent to which data points are discarded or otherwise not generated during the drop process may be based on the extent to which the amount of transmittable data exceeds the predefined threshold, for example. Other examples are also possible.

In line with the discussion above, the computing system could determine information associated with the environment around the vehicle, operation of the vehicle, and/or operation of the LIDAR device, so as to help facilitate aspects of the present disclosure. The computing system could do so in various ways.

In particular, the computing system could determine this information based on data from subsystem(s) of the vehicle and/or based on data from entities external to the vehicle. By way of example (and without limitation), the computing system could determine the information at issue based on propulsion data from a propulsion system of the vehicle (e.g., propulsion system 102), on-board sensor data from a sensor system of the vehicle (e.g., sensor system 104), control data from a control system of the vehicle (e.g., control system 106), peripheral data from peripherals of the vehicle (e.g., peripherals 108), other data from computing device(s) of the vehicle (e.g., computer system 112), and/or sensor data from one or more sensors external to the vehicle (e.g., sensors of a different autonomous vehicle).

In more specific examples, the data used to determine the information at issue may include object data about object(s) in the vehicle's environment, map data representative of the environment around the vehicle, traffic data indicative of traffic in the environment around the vehicle, and/weather data indicative of weather in the environment around the vehicle (e.g., weather data from environmental sensor(s) on the vehicle and/or from server(s) of the National Oceanic and Atmospheric Administration (NOAA)). Numerous other examples are also possible without departing from the scope of the present disclosure.

Further, the computing system could detect in various ways a trigger to engage in the drop process. For example, the computing system could determine that a current or expected bandwidth consumption associated with the communication channel is at or above the above-mentioned predefined threshold. In another example, the computing system could receive a request to engage in the drop process, such as from the computing device of the vehicle, for instance. In yet another example, the computing system may be configured to engage in the drop process according to a predetermined schedule (e.g., at certain time(s) of the day and/or once every several seconds). Thus, the computing system could use the predetermined schedule as basis to determine that the drop process should be initiated. In yet another example, a drop process that prevents emission of certain light pulses may provide thermal benefits, such as by helping to prevent overheating the LIDAR device. Given this, the computing system could engage in the drop process in response to determining that a thermal limitation is met (e.g., that a temperature of the LIDAR device and/or of another component associated with the vehicle exceeds a threshold temperature). Other examples are also possible.

Various example strategies for a drop process are described in more detail below. It should be understood that the computing system could engage in the drop process according to one or more of these strategies at any given time, and that two or more of these strategies could be combined in any feasible manner without departing from the scope of the present disclosure.

In one example implementation, the computing system could discard data points according to an analysis of characteristics of detected return light pulses. In particular, the computing system could determine information related to characteristics of detected return light pulses, such as respective intensity values and/or time delays associated with detected return light pulses, among other possibilities. Given this, the computing system could identify a subset the generated data points based on the identified subset including data points representative of detected return light pulses that have predefined characteristic(s). Such predefined characteristic(s) may help indicate that a given data point should be discarded or is at least a candidate to be discarded. Therefore, when the computing system engages in the drop process, the computing system could discard at least some of the data points of the identified subset.

In a specific example, the computing system could discard data points that represent low intensity return light pulses. In particular, a point cloud might include more useful information if it is generated based on data points representative of detected return light pulses that have relatively high respective intensities. Given this, the computing system could identify a subset the generated data points based on the identified subset including data points representative of detected return light pulses that have respective intensities lower than a predefined threshold intensity. And the computing system could discard at least some of the data points of the identified subset during the drop process.

In another specific example, the computing system could discard data points that represent return light pulses with relatively long associated time delays. In particular, as noted, a distance to an object could be determined according to a time delay between a light pulse emission and detection of a reflected returning light pulse. Typically, longer time delay(s) may indicate object(s) more distant from the vehicle. And in some situations, the computing device associated with the vehicle could postpone analysis of object(s) that are very distant from the vehicle without any consequences. Therefore, the computing system could identify and discard data points representative of detected return light pulses that have associated time delays longer than a predefined threshold time delay.

In yet another specific example, the computing system could discard data points that represent return light with relatively short associated time delays. Typically, shorter time delay(s) may indicate object(s) close to the vehicle. And in some situations, detected return light pulses with very short associated time delays may be those that reflected from the road surface or perhaps even from a part of the vehicle, and thus may be of less interest for purposes of analyzing detected return light pulses. Therefore, the computing system could identify and discard data points representative of detected return light pulses (i) that have associated time delays shorter than a predefined threshold time delay, and (ii) that perhaps have other characteristics indicating that those detected return light pulses are of less interest (e.g., in line with other examples and implementations described herein). Other examples are also possible.

In another example implementation, the computing system could selectively discard data points that are redundant. In particular, some situations may arise in which detected return light pulses may have substantially the same characteristics as one another. For instance, detected return light pulses may have substantially the same characteristics when they correspond to neighboring emitted light pulses that are reflected from certain types of objects, such as large and/or flat objects. Given this, the computing system could identify a subset the generated data points based on the identified subset including data points representative of detected return light pulses that have substantially the same characteristics as one another. And the computing system could discard some, but not all, of the data points of the identified subset during the drop process.

In a more specific example, the LIDAR device may generate a set of data points during one or more scans of the environment by the LIDAR device, and the computing system could identify and discard redundant data points of the set. For instance, the computing system could identify a subset of the data points of the set that have substantially the same intensities and associated time delays as one another, which may indicate that the data points of the subset represent detected return light pulses that reflected from the same object. And the computing system could then discard some, but not all, of the data points of the identified subset during the drop process, so as to gain the benefits of the drop process while retaining at least some of the data points to enable analysis of the object. Other examples are also possible.

In yet another example implementation, the computing system could discard and/or prevent generation of data points according to an analysis of data points generated by a different sensor of the vehicle (e.g., a different LIDAR device of the vehicle). In particular, the computing system could make a determination that the different sensor of the vehicle already generated data points representative of a particular portion of the environment. Such a determination could indicate that, if the LIDAR device also generates data points representative of that particular data points, then at least some of those data points would be redundant. Given this, the computing system could respond to the determination by identifying data points generated by the LIDAR device based on the identified data points representing detected return light pulses that correspond to the particular portion of the environment. And the computing system could then discard at least some of the identified data points during the drop process. Additionally or alternatively, the computing system could respond to the determination by identifying light pulses to be emitted towards the particular portion of the environment, and then preventing emission of at least some of the identified light pulses during the drop process. Other examples are also possible.

In yet another example implementation, the computing system could discard and/or prevent generation of data points according to an analysis of a maneuver being carried out or expected to be carried out by the vehicle. In particular, the computing system could determine the maneuver, which may be relate to any feasible type of movement by the vehicle, direction of travel of the vehicle, or the like. Then, the computing system could determine an off-target portion of the environment based on the determined maneuver, the off-target portion being one for which less or no information is needed in order to successfully operate the vehicle during the maneuver, among other possibilities. Given this, the computing system could identify data points generated by the LIDAR device based on the identified data points representing detected return light pulses that correspond to the off-target portion. And the computing system could then discard at least some of the identified data points during the drop process. Additionally or alternatively, the computing system could identify light pulses to be emitted towards the off-target portion, and could then prevent emission of at least some of the identified light pulses during the drop process.

In a more specific example, if the vehicle is or is expected to be traveling towards a particular portion of the environment, then it may be advantageous to determine more information about that particular portion compared to certain other portion(s) of the environment. Given this, the computing system could determine that the vehicle is or is expected to be traveling towards the particular portion of the environment (e.g., based on map data and/or accelerometer data), and could then determine an off-target portion of the environment based at least on the off-target portion being different from the particular portion. For instance, if the vehicle is traveling forward and downhill, then the computing system could deem a portion of the environment behind the vehicle (i.e., uphill of the vehicle) to be the off-target portion. Accordingly, the computing system could discard or otherwise prevent generation of at least some data points associated with the off-target portion. Other examples are also possible.

In yet another example implementation, the computing system could discard and/or prevent generation of data points according to an analysis of characteristics of an object in the environment around the vehicle. In particular, the computing system could determine characteristics of the object, such as by determining a location of the object relative to the vehicle, determining that the object is of a particular type, and/or identifying the object, among other options. Then, the computing system could determine an off-target portion of the environment based on the characteristics of the object, the off-target portion being one for which less or no information is needed in order to successfully operate the vehicle during presence of the object in the vehicle's environment, for instance. Given this, the computing system could identify data points generated by the LIDAR device based on the identified data points representing detected return light pulses that correspond to the off-target portion. And the computing system could then discard at least some of the identified data points during the drop process. Additionally or alternatively, the computing system could identify light pulses to be emitted towards the off-target portion, and could then prevent emission of at least some of the identified light pulses during the drop process.

In a more specific example, the computing system could determine that a fence is located in the vehicle's environment. Typically, a fence (e.g., a chain-link fence) is made from a highly reflective material and may therefore reflect numerous light pulses that the LIDAR device might emit towards it. Given this, a fence may be designated as a highly-reflective type of object that may cause generation of numerous data points during scan(s) by the LIDAR device. Also, if the fence is located away from the vehicle's direction of travel, this may indicate that less or no additional information about the fence is need to successfully operate the vehicle during presence of the fence in the vehicle's environment. Given this, the computing system could determine that the fence is a highly-reflective type of object and that the fence is located away from the vehicle's direction of travel, and could responsively discard data points and/or prevent emission of light pulses that are associated with a portion of the environment in which the fence is located.

Moreover, since a fence might be a barrier that include holes, light pulses emitted towards the fence could result in return light pulses that reflected from the fence as well as return light pulses that reflect from location(s) that are beyond the fence (e.g., the vehicle might be in an area on one side of the fence and the light pulses might reflect from object(s) located in an area on the other side of the fence). In practice, due to the fence being a barrier, return light pulses that reflect from location(s) beyond the fence might be of less interest. Therefore, when the computing system discards data points and/or prevents emission of light pulses associated with a portion of the environment in which the fence is located as described, the portion at issue could include the location (e.g., surface) of the fence and/or location(s) beyond the fence, among other possibilities. Other examples are also possible.

In yet another example implementation, the computing system could discard and/or prevent generation of data points according to an analysis of whether an object has been detected in a particular portion of the vehicle's environment. For example, the computing system could make a determination that no object is detected in that particular portion of the environment, which may indicate that less or no additional information about that particular portion is needed at least for some threshold period of time. Given this, the computing system could respond to the determination by identifying data points generated by the LIDAR device based on the identified data points representing detected return light pulses that correspond to the particular portion of the environment. And the computing system could then discard at least some of the identified data points during the drop process. Additionally or alternatively, the computing system could respond to the determination by identifying light pulses to be emitted towards the particular portion of the environment, and then preventing emission of at least some of the identified light pulses during the drop process. Other examples are also possible.

In yet another example implementation, the computing system could discard and/or prevent generation of data points according to an analysis of a traffic and/or weather conditions in the environment around the vehicle. In particular, the computing system could determine an off-target portion of the environment based on the traffic and/or weather conditions, the off-target portion being one for which less or no information is needed in order to success-fully operate the vehicle during the condition(s) at issue, for instance. Given this, the computing system could identify data points generated by the LIDAR device based on the identified data points representing detected return light pulses that correspond to the off-target portion. And the computing system could then discard at least some of the identified data points during the drop process. Additionally or alternatively, the computing system could identify light pulses to be emitted towards the off-target portion, and could then prevent emission of at least some of the identified light pulses during the drop process.

In a more specific example, the computing system could make a determination that an extent of traffic (e.g., vehicle and/or pedestrian traffic) a particular portion of the environ-ment is below a threshold extent of traffic. For instance, the computing system could determine a measure indicating the extent of vehicle and/or pedestrian traffic in the particular environment portion, such as by determining traffic density indicating the number of vehicles and/or pedestrians per unit area in that particular environment portion, among other possibilities. And the computing system could then deter-mine that the measure at issue is below a threshold measure, such as by determining the traffic density is lower than a predefined threshold traffic density, among other possibili-ties. In any case, because that particular portion of the environment has an extent of traffic that is lower than a threshold extent of traffic, less or no additional information may be needed for that particular portion. Therefore, the computing system could deem this particular portion to be the off-target portion, and could in turn discard and/or prevent generation of data points associated with the par-ticular portion.

In another specific example, the computing system could determine a weather condition for a particular portion of the environment, and that this weather condition corresponds to a predefined unfavorable weather condition(s), such as snow, rain, sleet, hail, ice, and/or fog, among others. Typi-cally, such unfavorable weather phenomena (e.g., rain) may reflect numerous light pulses that the LIDAR device might emit towards it, thereby causing generation of numerous corresponding data points during scan(s) by the LIDAR device. Yet, such data points might not include any or much information that is needed for successful operation of the vehicle. In fact, such data point may represent sporadic return light pulses that were detected, and may thus impact successful detection of objects in the environment. There-fore, the computing system could discard and/or prevent generation of data points associated with the particular portion of the environment in which predefined unfavorable weather condition(s) are detected.

In this regard, the computing system could be configured to make a determination that a particular data point repre-sents a particular return light pulse that reflected from unfavorable weather phenomena (e.g., rain). For example, the LIDAR device may generate the particular data point during a particular scan of the environment, and may also generate other data points during scan(s) that immediately precede and/or follow the particular scan at issue. Given this, if the computing system makes a determination that none of those other data points represent a return light pulse having characteristic(s) that are the same or similar to characteristics of the particular return light pulse, this may indicate that the particular return light pulse is an isolated or otherwise randomly appearing return light pulse that likely reflected from unfavorable weather phenomena. Therefore, the computing system could respond to the determination by discarding the particular data point. Other examples are also possible.

In a further aspect, the computing system could apply a pseudo-random code to select data points to be discarded and/or light pulses for which emission is to be prevented. For example, the above-described strategies may lead to situations in which the computing system discards some, but not necessarily all, of the data points that were identified as candidates to be discarded. Given this, the computing sys-tem could apply the pseudo-random code to select data point to be discarded from among those identified data points. A similar approach could extend to application of the pseudo-random code to select light pulses for which emission is to be prevented. Other examples are also possible.

Additionally or alternatively, the computing system could apply a round-robin procedure to select data points to be discarded and/or light pulses for which emission is to be prevented, such as during the above-mentioned situations for instance. For example, the computing system may iden-tify a first set of data points to discard that represent a first group of return light pulses detected during a first time interval (e.g., during a particular scan of the environment by the LIDAR device), and the computing system could apply the round-robin procedure to select a data point of the first set representing the first return light pulse that was detected from among those of the first group. Then, the computing system may identify a second set of data points to discard that represent a second group of return light pulses detected during a second time interval (e.g., during a subsequent scan of the environment by the LIDAR device), and the computing system could apply the round-robin procedure to select a data point of the second set representing the second return light pulse that was detected from among those of the second group. Other examples are also possible.

In yet a further aspect, when the computing system engages in the drop process according to a determined strategy, light pulses emitted by the LIDAR device may end up having variable spacing relative to one another. For example, the computing system could prevent emission of light pulses toward a particular portion of the vehicle's environment, such as toward a road surface near the vehicle, for instance. As a result, the LIDAR device will not emit light pulses toward that particular portion during a given 360° scan of the environment, but may still emit light pulses respectively toward other portion(s) of the environment during that scan. Given this, the scan may include emission of light pulses that have variable spacing relative to one another, rather than emission of light pulses that are equally spaced throughout the scan. Moreover, in addition to the various benefits described herein, a drop process that prevents emission of certain light pulses may provide thermal benefits, such as by helping to prevent overheating the LIDAR device, among others. Other examples are also possible.

Figure 6:
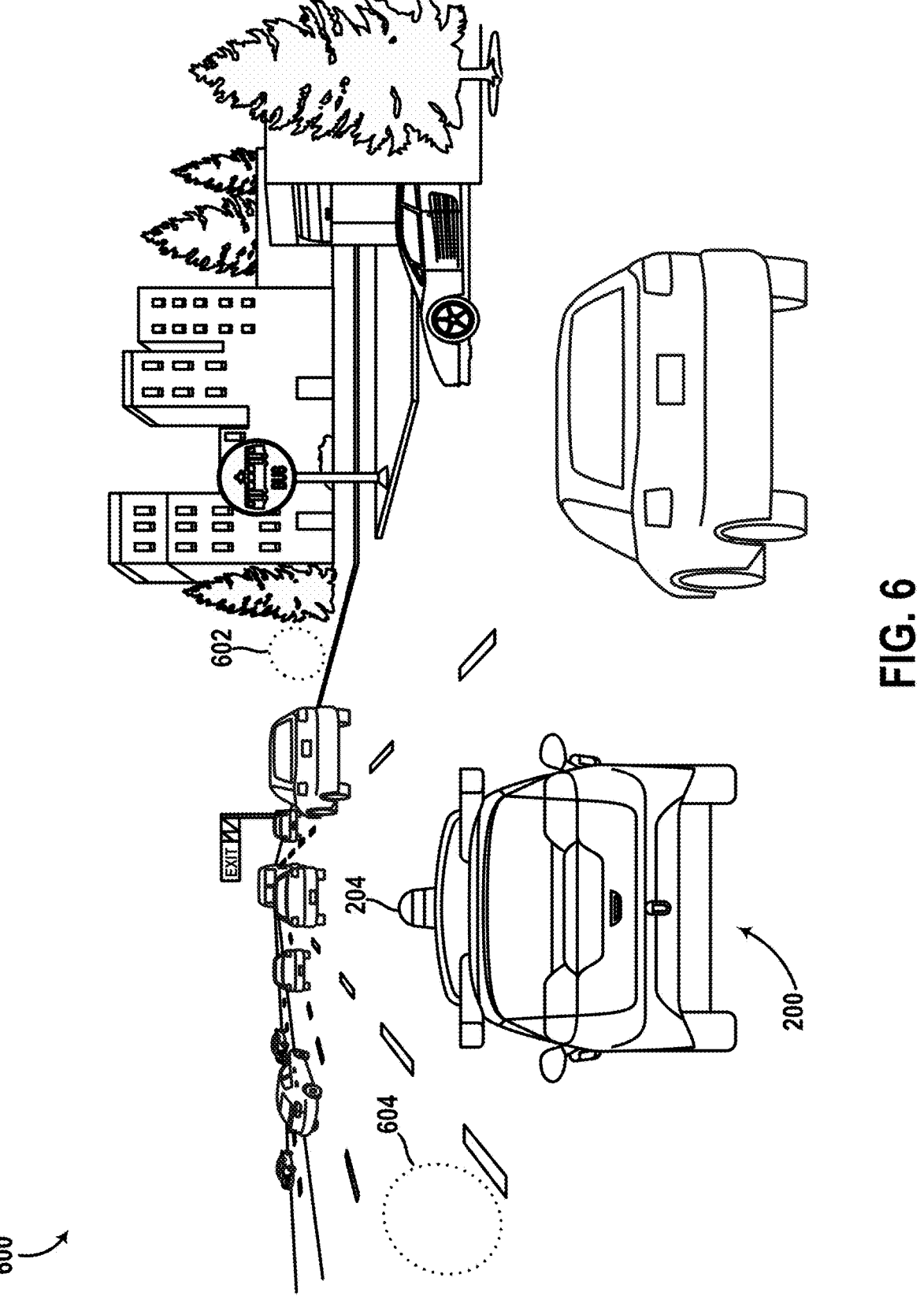
FIG. 6 is an illustration of an example scenario for engaging in a drop process based on a dynamically determined strategy, according to example embodiments.

FIG. 6 illustrates an example scenario for engaging in a drop process according to a dynamically determined strategy. As shown, vehicle 200 has LIDAR unit 204 and is traveling through an environment 600. In this scenario, a computing system associated with the LIDAR unit 204 could determine that no object is detected in portion 602 of the environment 600, and may responsively prevent emission, by the LIDAR unit 204, of some light pulses towards that portion 602 of the environment 600, at least for some predefined time period. Additionally, the computing system could determine that an extent of traffic in portion 604 of the environment 600 is lower than a threshold extent of traffic, and may responsively discard some of the data points generated by the LIDAR unit 204 to represent detected return light pulses that reflected from this portion 604. Other examples and illustrations are also possible.

V. Example Processes

FIG. 7 is a flowchart diagram of a method 700, according to example embodiments. In some embodiments, one or more of the blocks of FIG. 7 may be performed by a computing system. The computing system may include computing components such as a non-volatile memory (e.g., a hard drive or a read-only memory (ROM)), a volatile memory (e.g., a random-access memory (RAM), such as dynamic random-access memory (DRAM) or static random-access memory (SRAM)), a user-input device (e.g., a mouse or a keyboard), a display (e.g., a light-emitting diode (LED) display or a liquid-crystal display (LCD)), and/or a network communication controller (e.g., a WIFI® controller, based on IEEE 802.11 standards, or an Ethernet controller). The computing system, for example, may execute instructions stored on a non-transitory, computer-readable medium (e.g., a hard drive) to perform one or more of the operations contemplated herein.

At block 702, method 700 may involve operating, by a computing system, a light detection and ranging (LIDAR) device to scan an environment around a vehicle, where the operating includes causing the LIDAR device to emit light pulses and to detect return light pulses, where the LIDAR device is configured to generate a set of data points representative of the detected return light pulses, where the computing system is configured to engage in a drop process that includes one or more of (i) discarding one or more data points of the set or (ii) preventing emission of one or more light pulses by the LIDAR device, and where the computing system is further configured to transmit, to a computing device via a communication channel, remaining data points of the set other than the one or more data points that are discarded.

At block 704, method 700 may involve determining, by the computing system, information associated with one or more of the environment around the vehicle, operation of the vehicle, or operation of the LIDAR device.

At block 706, method 700 may involve detecting, by the computing system, a trigger to engage in the drop process.

At block 708, method 700 may involve, in response to detecting the trigger, the computing system (i) using the determined information as basis to determine a strategy for the drop process, and (ii) engaging in the drop process in accordance with the determined strategy.

In some embodiments of method 700, determining the information may involve determining the information based on one or more of: on-board sensor data from a sensor system of the vehicle, external sensor data from one or more sensors external to the vehicle, propulsion data from a propulsion system of the vehicle, control data from a control system of the vehicle, other data from the computing device, map data representative of the environment around the vehicle, traffic data indicative of traffic in the environment around the vehicle, temperature data indicative of a temperature of the LIDAR device, temperature data indicative of a temperature of the vehicle, or weather data indicative of weather in the environment around the vehicle.

In some embodiments of method 700, detecting the trigger may involve determining that a current or expected bandwidth consumption associated with the communication channel is at or above a threshold bandwidth consumption.

In some embodiments of method 700, determining the strategy for the drop process may involve determining one or more of (i) data points of the set to be discarded or (ii) light pulses for which emission is to be prevented.

In some embodiments of method 700, engaging in the drop process reduces or at least maintains bandwidth use or overfill associated with the communication channel.

In some embodiments of method 700, determining the information may involve determining characteristics of detected return light pulses, determining the strategy may involve identifying a subset of the data points of the set based on the identified subset including data points representative of detected return light pulses that have one or more predefined characteristics, and engaging in the drop process in accordance with the determined strategy may involve discarding the data points of the identified subset.

In such embodiments, the identifying may involve identifying the subset based on the identified subset including data points representative of detected return light pulses that have respective intensities lower than a threshold intensity.

In some embodiments of method 700, determining the information may involve determining characteristics of detected return light pulses, determining the strategy may involve identifying a subset of the data points of the set based on the identified subset including data points representative of detected return light pulses that have substantially the same characteristics as one another, and engaging in the drop process in accordance with the determined strategy may involve discarding some, but not all, of the data points of the identified subset.

In some embodiments of method 700, determining the information may involve making a determination that a different sensor of the vehicle already generated data points representative of a particular portion of the environment, determining the strategy may involve, in response to making the determination that a different sensor of the vehicle already generated data points representative of a particular portion of the environment, applying an identification process that includes one or more of (i) identifying a subset of the data points of the set based on the identified subset including data points representative of detected return light pulses that correspond to the particular portion of the environment or (ii) identifying light pulses to be emitted towards the particular portion of the environment, and engaging in the drop process in accordance with the determined strategy may involve one or more of discarding at least some of the data points of the identified subset or preventing emission of at least some of the identified light pulses.

In some embodiments of method 700, determining the information may involve determining a maneuver being carried out or expected to be carried out by the vehicle, determining the strategy may involve determining an off-target portion of the environment based on the determined maneuver and applying an identification process, the identification process including one or more of (i) identifying a subset of the data points of the set based on the identified subset including data points representative of detected return light pulses that correspond to the off-target portion of the environment or (ii) identifying light pulses to be emitted towards the off-target portion of the environment, and engaging in the drop process in accordance with the determined strategy may involve one or more of discarding at least some of the data points of the identified subset or preventing emission of at least some of the identified light pulses.

In such embodiments, determining the maneuver may involve determining that the vehicle is or is expected to be traveling towards a particular portion of the environment, and determining the off-target portion may involve determining the off-target portion based at least on the off-target portion being different from the particular portion.

In some embodiments of method 700, determining the information may involve determining characteristics of an object in the environment around the vehicle, determining the strategy may involve determining an off-target portion of the environment based on the determined characteristics of the object and applying an identification process, the identification process comprising one or more of (i) identifying a subset of the data points of the set based on the identified subset including data points representative of detected return light pulses that correspond to the off-target portion of the environment or (ii) identifying light pulses to be emitted towards the off-target portion of the environment, and engaging in the drop process in accordance with the determined strategy may involve one or more of discarding at least some of the data points of the identified subset or preventing emission of at least some of the identified light pulses.

In such embodiments, determining characteristics of the object may involve one or more of determining a location of the object relative to the vehicle, determining that the object is of a particular type, or identifying the object.

In some embodiments of method 700, determining the information may involve making a determination that no object is detected in a particular portion of the environment around the vehicle, determining the strategy may involve, in response to making the determination that no object is detected in a particular portion of the environment around the vehicle, applying an identification process that includes one or more of (i) identifying a subset of the data points of the set based on the identified subset including data points representative of detected return light pulses that correspond to the particular portion of the environment or (ii) identifying light pulses to be emitted towards the particular portion of the environment, and engaging in the drop process in accordance with the determined strategy may involve one or more of discarding at least some of the data points of the identified subset or preventing emission of at least some of the identified light pulses.

In some embodiments of method 700, determining the information may involve determining a condition associated with one or more of traffic or weather in the environment around the vehicle, determining the strategy may involve determining an off-target portion of the environment based on the determined condition and applying an identification process, the identification process including one or more of (i) identifying a subset of the data points of the set based on the identified subset including data points representative of detected return light pulses that correspond to the off-target portion of the environment or (ii) identifying light pulses to be emitted towards the off-target portion of the environment, and engaging in the drop process in accordance with the determined strategy may involve one or more of discarding at least some of the data points of the identified subset or preventing emission of at least some of the identified light pulses.

In such embodiments, determining the condition may involve making a determination that an extent of traffic in a particular portion of the environment is below a threshold extent of traffic, and determining the off-target portion may involve selecting the off-target portion to be the particular portion based on the determination.

Additionally or alternatively, in such embodiments, determining the condition may involve making a determination that a particular portion of the environment has one or more of snow, rain, sleet, hail, ice, fog, or another predefined weather condition, and determining the off-target portion may involve selecting the off-target portion to be the particular portion based on the determination.

In some embodiments of method 700, determining the strategy may involve applying a pseudo-random code or a round-robin procedure to select one or more of (i) data points of the set to be discarded or (ii) light pulses for which emission is to be prevented, and engaging in the drop process in accordance with the determined strategy may involve one or more of (i) discarding the data points of the set that are selected according to application of the pseudo-random code or of the round-robin procedure or (ii) preventing emission of the light pulses that are selected according to application of the pseudo-random code or of the round-robin procedure.

IV. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   operating, by a computing system, a light detection and ranging (LIDAR) device to scan an environment around a vehicle, wherein the operating comprises causing the LIDAR device to emit light pulses and to detect return light pulses, wherein the LIDAR device is configured to generate a set of data points representative of the detected return light pulses;
   identifying, by the computing system and from among the data points of the set, a subset of data points to be discarded, wherein identifying the subset of data points to be discarded is based on determining that the data points of the subset are representative of detected return light pulses that have both a first predefined characteristic and a second predefined characteristic, wherein the first predefined characteristic corresponds to an intensity of a detected return light pulse being lower than a predefined threshold intensity, and wherein the second predefined characteristic corresponds to the detected return light pulse having a predefined time characteristic relative to a predefined threshold time delay;
   discarding, by the computing system, the data points of the identified subset; and
   transmitting, by the computing system and to a computing device via a communication channel, data points of the set other than the discarded data points.

2. The method of claim 1, wherein the detected return light pulse having the predefined time characteristic relative to the predefined threshold time delay comprises the detected return light pulse having a time delay between a light pulse emission time and a detection time of the detected return light pulse that is longer than the predefined threshold time delay.

3. The method of claim 1, wherein the detected return light pulse having the predefined time characteristic relative to the predefined threshold time delay comprises the detected return light pulse having a time delay between a light pulse emission time and a detection time of the detected return light pulse that is shorter than the predefined threshold time delay.

4. The method of claim 1, wherein identifying the subset of data points to be discarded is further based on map data representative of the environment around the vehicle.

5. The method of claim 1, wherein identifying the subset of data points to be discarded is further based on weather data indicative of weather in the environment around the vehicle.

6. The method of claim 1, wherein identifying the subset of data points to be discarded is further based on determining that the data points of the subset are representative of detected return light pulses from an object of a particular type.

7. The method of claim 1, further comprising:
   detecting a trigger, wherein the discarding is in response to detecting the trigger.

8. The method of claim 7, wherein detecting the trigger comprises determining that a current or expected bandwidth consumption associated with the communication channel is at or above a threshold bandwidth consumption.

9. The method of claim 1, wherein the computing device is configured to operate the vehicle based on the data points transmitted via the communication channel.

10. A computing system comprising:

one or more processors;

a non-transitory computer readable medium; and program instructions stored on the non-transitory computer readable medium and executable by the one or more processors to perform operations comprising:

operating a light detection and ranging (LIDAR) device to scan an environment around a vehicle, wherein the operating comprises causing the LIDAR device to emit light pulses and to detect return light pulses, wherein the LIDAR device is configured to generate a set of data points representative of the detected return light pulses;

identifying, from among the data points of the set, a subset of data points to be discarded, wherein identifying the subset of data points to be discarded is based on determining that the data points of the subset are representative of detected return light pulses that have both a first predefined characteristic and a second predefined characteristic, wherein the first predefined characteristic corresponds to an intensity of a detected return light pulse being lower than a predefined threshold intensity, and wherein the second predefined characteristic corresponds to the detected return light pulse having a predefined time characteristic relative to a predefined threshold time delay;

discarding the data points of the identified subset; and transmitting, to a computing device via a communication channel, data points of the set other than the discarded data points.

11. The computing system of claim 10, wherein identifying the subset of data points to be discarded is further based on map data representative of the environment around the vehicle.

12. The computing system of claim 10, wherein identifying the subset of data points to be discarded is further based on weather data indicative of weather in the environment around the vehicle.

13. The computing system of claim 10, wherein identifying the subset of data points to be discarded is further based on determining that the data points of the subset are representative of detected return light pulses from an object of a particular type.

14. A system comprising:

a light detection and ranging (LIDAR) device; and a computing system configured to perform operations comprising:

operating the LIDAR device to scan an environment around a vehicle, wherein the operating comprises causing the LIDAR device to emit light pulses and to detect return light pulses, wherein the LIDAR device is configured to generate a set of data points representative of the detected return light pulses;

identifying, from among the data points of the set, a subset of data points to be discarded, wherein identifying the subset of data points to be discarded is based on determining that the data points of the subset are representative of detected return light pulses that have both a first predefined characteristic and a second predefined characteristic, wherein the first predefined characteristic corresponds to an intensity of a detected return light pulse being lower than a predefined threshold intensity, and wherein the second predefined characteristic corresponds to the detected return light pulse having a predefined time characteristic relative to a predefined threshold time delay;

discarding the data points of the identified subset; and transmitting, to a computing device via a communication channel, data points of the set other than the discarded data points.

15. The system of claim 14, wherein identifying the subset of data points to be discarded is further based on weather data indicative of weather in the environment around the vehicle.

16. The system of claim 14, wherein identifying the subset of data points to be discarded is further based on determining that the data points of the subset are representative of detected return light pulses from an object of a particular type.

17. The computing system of claim 10, wherein the detected return light pulse having the predefined time characteristic relative to the predefined threshold time delay comprises the detected return light pulse having a time delay between a light pulse emission time and a detection time of the detected return light pulse that is longer than the predefined threshold time delay.

18. The computing system of claim 10, wherein the detected return light pulse having the predefined time characteristic relative to the predefined threshold time delay comprises the detected return light pulse having a time delay between a light pulse emission time and a detection time of the detected return light pulse that is shorter than the predefined threshold time delay.

19. The system of claim 14, wherein the detected return light pulse having the predefined time characteristic relative to the predefined threshold time delay comprises the detected return light pulse having a time delay between a light pulse emission time and a detection time of the detected return light pulse that is longer than the predefined threshold time delay.

20. The system of claim 14, wherein the detected return light pulse having the predefined time characteristic relative to the predefined threshold time delay comprises the detected return light pulse having a time delay between a light pulse emission time and a detection time of the detected return light pulse that is shorter than the predefined threshold time delay.

* * * * *